(12) United States Patent
Chen et al.

(10) Patent No.: US 9,888,302 B2
(45) Date of Patent: Feb. 6, 2018

(54) METHOD AND DEVICE FOR BANDWIDTH ASSIGNMENT OF OPTICAL BURST RING

(71) Applicant: ZTE Corporation, Shenzhen (CN)

(72) Inventors: Xue Chen, Shenzhen (CN); Xintian Hu, Shenzhen (CN); Hongxiang Guo, Shenzhen (CN); Shaoliang Luo, Shenzhen (CN); Gaofeng An, Shenzhen (CN)

(73) Assignee: XI'AN ZONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 14/907,753

(22) PCT Filed: Jun. 16, 2014

(86) PCT No.: PCT/CN2014/079996
§ 371 (c)(1),
(2) Date: Jan. 26, 2016

(87) PCT Pub. No.: WO2014/183724
PCT Pub. Date: Nov. 20, 2014

(65) Prior Publication Data
US 2016/0182983 A1     Jun. 23, 2016

(30) Foreign Application Priority Data
Jul. 26, 2013   (CN) .......................... 2013 1 0320866

(51) Int. Cl.
*H04L 12/437*   (2006.01)
*H04L 12/42*   (2006.01)
(Continued)

(52) U.S. Cl.
CPC ....... *H04Q 11/0066* (2013.01); *H04B 10/275* (2013.01); *H04J 14/0275* (2013.01);
(Continued)

(58) Field of Classification Search
USPC .......................................................... 398/47
See application file for complete search history.

(56) References Cited

U.S. PATENT DOCUMENTS

2003/0185229 A1   10/2003   Shachar et al.
2004/0037301 A1*   2/2004   Shachar ............ H04L 12/43
                                                          370/404
(Continued)

FOREIGN PATENT DOCUMENTS

| CN | 1512698 A | 7/2004 |
| CN | 1588827 A | 3/2005 |
| CN | 101895367 A | 11/2010 |

OTHER PUBLICATIONS

International Search Report for corresponding application PCT/CN2014/079996 filed Jun. 16, 2014; dated Sep. 19, 2014.

*Primary Examiner* — David Payne
*Assistant Examiner* — Omar S Ismail
(74) *Attorney, Agent, or Firm* — Cantor Colburn LLP

(57) ABSTRACT

The disclosure provides a method for bandwidth assignment of an Optical Burst Ring (OBRing), which includes that: a master node acquires current bandwidth resources, and excludes bandwidth resources occupied by over-the-master-node connections from the current bandwidth resources to obtain bandwidth resources to be assigned; and the master node assigns the bandwidth resources to be assigned to each node according to bandwidth requests of each node in the OBRing. The disclosure also provides a device for bandwidth assignment of an OBRing. According to embodiments of the disclosure, the bandwidth resources occupied by the over-the-master-node connections are excluded before bandwidth assignment is started, so that the problem of receiving conflict caused by an over-the-master-node service data connection is solved.

13 Claims, 12 Drawing Sheets

(51) Int. Cl.
*H04L 12/43* (2006.01)
*H04B 10/275* (2013.01)
*H04Q 11/00* (2006.01)
*H04J 14/02* (2006.01)
*H04L 12/801* (2013.01)

(52) U.S. Cl.
CPC ............ *H04L 12/42* (2013.01); *H04L 12/43* (2013.01); *H04L 12/437* (2013.01); *H04L 47/10* (2013.01); *H04Q 2011/0064* (2013.01); *H04Q 2011/0086* (2013.01)

(56) References Cited

U.S. PATENT DOCUMENTS

| | | |
|---|---|---|
| 2005/0147411 A1 | 7/2005 | Hamou et al. |
| 2009/0162064 A1* | 6/2009 | Mizutani ............... H04J 3/0682 398/66 |
| 2010/0034536 A1* | 2/2010 | Lee ..................... H04J 14/0283 398/45 |
| 2011/0020004 A1 | 1/2011 | Cao |
| 2015/0131991 A1* | 5/2015 | Hattori ................ H04J 14/0212 398/47 |

\* cited by examiner

METHOD AND DEVICE FOR BANDWIDTH ASSIGNMENT OF OPTICAL BURST RING

TECHNICAL FIELD

The disclosure relates to the optical communications field, and in particular to a method and device for bandwidth assignment of an Optical Burst Ring (OBRing).

BACKGROUND

For meeting requirements on orientation to service traffic which will dynamically change in the future and efficient utilization of bandwidth resources, an industrial community proposes a concept of an OBRing based on all-optical packet transmission and switching. The OBRing may greatly reduce a cost of software and hardware of an existing network and a cost of operation administration and maintenance of the existing network, and the OBRing is particularly suitable for a network full-interconnection application scenario of establishing a connection between any two points.

The OBRing may adopt a single-ring or double-ring topology. For example, as shown in FIG. 1, four nodes A, B, C and D are connected together through a single ring. An OBRing consists of a control plane and a data plane, which respectively use different working wavelengths. For the control plane, a master node A controls bandwidth resources of whole network in a centralized manner. A control frame sent by the master node A is transmitted by one circle around the single ring to distribute bandwidth grants to nodes B, C and D, and returns to the master node A with bandwidth requests of the nodes B, C and D. The master node A updates the bandwidth grants according to the bandwidth requests. For the data plane, at least one Optical Burst (OB) with a fixed length of each OB is used to bear one or more services in the OBRing. A duration of each OB is defined as an OB timeslot. OBs which are sent by different nodes and have different wavelengths are temporally aligned, that is, OBs with different wavelengths may share the same OB timeslot. The OBs are all-optically and transparently transmitted through nodes through which the OBs pass without optic-electro-optic conversion.

Each node broadcasts one or more OBs in at least one OB timeslot specified by the bandwidth grants by virtue of a fixed wavelength. The nodes update the bandwidth grants every one or more OB timeslots. An updating period of the bandwidth grants is defined as a Dynamic Bandwidth Assignment (DBA) period. After an OB arrives at a destination node, the destination node configures a tunable receiver according to a control frame, and receives the OB on a specified wavelength in a specified timeslot. The OB may be transmitted by an upstream node of the master node, and ends at a downstream node of the master node to establish an over-the-master-node connection or a not-over-the-master-node connection after being transparently transmitted over the master node, as shown in FIG. 2. A data connection may be established between any two nodes by sending and receiving one or more OBs, and a bandwidth of the data connection may be dynamically regulated by regulating the number of the one or more OBs. From the above, characteristics of the OBRing may be summarized as follows: a ring topology and multiple working wavelengths are adopted, the master node is adopted for centralized control, all-optical burst transmission and switching is supported, and a dynamic network full-interconnection application scenario is supported.

A method for bandwidth assignment is one of key technologies for implementing an OBRing. However, in the related art, above method for bandwidth assignment may not be directly applied to the OBRing.

As shown in FIG. 3, as an optical access network, a Passive Optical Network (PON) adopts a point-to-multi-point tree topology. An Optical Line Terminal (OLT) is connected with multiple Optical Network Units (ONUs) through an Optical Distribution Network (ODN). A direction from each ONU to the OLT is defined as an uplink direction. The OLT controls uplink bandwidth assignment of the PON in a centralized manner. The OLT periodically sends bandwidth grants to all the ONUs. The ONUs send uplink services to the OLT at different time with the same working wavelength according to the bandwidth grants, and report bandwidth requests. The OLT receives all the uplink services and bandwidth requests, and makes new bandwidth grants according to the bandwidth requests.

Such a method for bandwidth assignment for the PON is inapplicable to the OBRing. First, connections are established between one point and multiple points in the PON, while a connection is established between any two points in the OBRing, so that the method for bandwidth assignment for the PON only involves fair and effective bandwidth sharing of different sources when solving multi-source and single-sink problems, but cannot simultaneously take fair and effective sharing of bandwidth resources between different destination nodes in the OBRing into account. Second, centralized control is performed in a tree topology in the PON, while centralized control is performed in a ring topology in the OBRing. A control frame in the OBRing is sent by the master node, and ends at the master node after being transmitted by a circle around the ring, and an OB which bears a service may be continuously transmitted after being transmitted over the master node, so that when the master node in the OBRing starts making a new bandwidth grant after receiving a bandwidth request in a certain control frame, an over-the-master-node connection established according to the control frame has not yet finished transmission of the OB, and the OB is required to be transparently transmitted over the master node for continuous transmission, which may cause a receiving conflict; however, in the PON adopting the tree topology, all bandwidths of the network are available when the OLT makes bandwidth grants; and therefore, the receiving conflict caused by the over-the-master-node connection in the OBRing cannot be solved by the method for bandwidth assignment for the PON.

As a metropolitan area network technology, a Resilient Packet Ring (RPR) adopts an opposite double-ring topology, and both a control plane and a data plane are implemented in an electric domain. The RPR adopts distributed bandwidth resource management, and a connection is established between any two points. As shown in FIG. 4, taking an inner ring for example, after service data enters a node, header detection is performed to determine to send a downlink service or a service which passes by to a transition buffer area. A uplink service of the node is also sent to the transition buffer area. If the transition buffer area of the node is congested, congestion information may be transmitted to each node on the ring. Each node limits uplink services entering the transition buffer area according to a congestion control algorithm by virtue of a regulator. Therefore, bandwidth resources of the whole network are regulated at a source node to be managed.

Such a method for bandwidth resource management for the RPR is also inapplicable to the OBRing. First, an OB in the OBRing is transparently transmitted through one or more nodes through which the OB passes in an optical domain without electric domain processing, and is not cached in one or more intermediate nodes, so that it may not be implemented that a service is cached by virtue of a transition buffer area and bandwidth resources are fairly and effectively shared at a source node by virtue of the congestion control algorithm like in the RPR. Second, the RPR adopts distributed bandwidth resource management, and each node autonomously sends and receives services in the electric domain, so that the receiving conflict caused by an over-the-master-node connection under centralized control in the OBRing may not be solved with reference to the method for bandwidth resource management for the RPR.

As shown in FIG. 5, a switching matrix realizes a fast packet forwarding function in a router. An elongated data packet is divided into cells with fixed lengths after entering the router. The cells enter an input port of the switching matrix, and are transmitted to an output port through the switching matrix. Finally, the cells are recovered into the data packet, and the data packet is transmitted out of the router. In the switching matrix, a scheduling algorithm is adopted to fairly and effectively establish a connection between any input port and output port. If the input port of the switching matrix is considered as a sender of a node in the OBRing, the output port is considered as a receiver and a connection between the input port and output port in the switching matrix is considered as a data connection established between a source node and a destination node in the OBRing by sending and receiving OBs, a connection may be fairly and effectively established between any two points in the OBRing with reference to the scheduling algorithm of establishing a connection between any input port and output port in the switching matrix.

The scheduling algorithm for the switching matrix is not directly applicable to the OBRing. In the scheduling algorithm for the switching matrix, all the cells may pass through the switching matrix within one scheduling interval. During each scheduling, all connections between the input port and output port in the switching matrix are available. If the scheduling algorithm is directly applied to the OBRing, the receiving conflict caused by the over-the-master-node connection may occur. Therefore, the scheduling algorithm for the switching matrix may not be directly adopted for solving bandwidth assignment problems of the OBRing. Therefore, the bandwidth assignment problems of the OBRing may not be solved in the related art.

SUMMARY

The embodiments of disclosure provide a method and device for bandwidth assignment of an OBRing, so as to at least solve a problem in the related art about a receiving conflict caused by an over-the-master-node service data connection during centralized control over bandwidth assignment in a ring of an all-optical burst transmission and switching and solve a problem in the related art about how to realize fair and effective utilization of bandwidth resources in a multi-source and multi-sink application scenario of establishing a connection between any two points.

In order to solve the technical problems, the embodiments of the disclosure provide a method for bandwidth assignment of an OBRing, which may include that:

acquiring, by a master node, current bandwidth resources, and excluding bandwidth resources occupied by over-the-master-node connections from the current bandwidth resources to obtain bandwidth resources to be assigned; and assigning, by the master node, the bandwidth resources to be assigned to each node according to bandwidth requests of each node in the OBRing.

In an example embodiment, the master node takes one Optical Burst, OB, timeslot as a unit and performs the bandwidth assignment on OB timeslots one by one when the bandwidth resources to be assigned are assigned to each node, and executes an operation of excluding the bandwidth resources occupied by the over-the-master-node connections from the current bandwidth resources before the bandwidth assignment is performed on each OB timeslot.

In an example embodiment, the method further comprises: before the bandwidth assignment is performed, acquiring, by the master node, bandwidth requests in one Dynamic Bandwidth Assignment, DBA, period, classifying, by the master node, each bandwidth request of the bandwidth requests in the DBA period according to service levels to obtain one or more types of bandwidth requests, wherein, each type of bandwidth requests corresponds to one priority, and sequentially performing, by the master node, one or more rounds of bandwidth assignment on each type of bandwidth requests consistent with a preset condition according to priorities of the one or more types of bandwidth requests, wherein each round of bandwidth assignment corresponds to one type of bandwidth requests and bandwidth assignment being performed on OB timeslots one by one by taking one OB timeslot as a unit in each round of bandwidth assignment.

In an example embodiment, the method further comprises: before the bandwidth assignment is performed on each OB timeslot, setting, by the master node, a logic destination node, called a first logic destination node, for the master node and an adjacent upstream node of the master node, setting, by the master node, two logic destination nodes, respectively called the first logic destination node and a second logic destination node, for the other nodes except for the master node and the adjacent upstream node of the master node, wherein the first logic destination node is configured to establish a not-over-the-master-node connection with an upstream node of the first logic destination node, and the second logic destination node is configured to establish an over-the-master-node connection with a downstream node of the second logic destination node, and setting, by the master node, one or more logic source nodes for each node; acquiring, by the master node, the current bandwidth resources, and excluding the bandwidth resources occupied by the over-the-master-node connections from the current bandwidth resources comprises: before bandwidth assignment is performed on each OB timeslot, acquiring, by the master node, a destination node of an over-the-master-node connection in the current OB timeslot, and excluding the first logic destination node corresponding to the destination node of the over-the-master-node connection; and assigning, by the master node, the bandwidth resources to be assigned to each node according to the bandwidth requests of each node in the OBRing comprises: in each OB timeslot, looking for and establishing, by the master node, connections between the rest of logic source nodes and logic destination nodes according to bandwidth requests existing in the current timeslot, wherein the bandwidth requests existing in the current timeslot are determined based on bandwidth requests according to which this round of bandwidth assignment is performed, bandwidth requests which are not met before this round of bandwidth assignment and bandwidth requests, which have been met in timeslots on which bandwidth assignment has been performed, in this round of bandwidth assignment.

In an example embodiment, in each OB timeslot, looking for and establishing, by the master node, the connections between the rest of logic source nodes and logic destination nodes according to the bandwidth requests existing in the current timeslot comprises: executing the following iteration process: sending, by the logic source nodes with bandwidth requests existing in this iteration, virtual requests to logic destination nodes, and specifying, by the logic source nodes with bandwidth requests existing in this iteration, priorities of the virtual requests, wherein the bandwidth requests existing in this iteration are the bandwidth requests existing in the current timeslot during the first iteration; selecting, by the logic destination nodes, virtual requests with the highest priorities, and sending, by the logic destination nodes, virtual grants to the corresponding logic source nodes, which sends the virtual requests with the highest priorities, wherein priorities of the virtual grants are consistent with the priorities of the virtual requests upon which the virtual grants are responded; selecting, by the logic source nodes, the virtual grants with the highest priorities, and establishing connections with the corresponding logic destination nodes, which sends the virtual grants with the highest priorities; and judging whether a specified number of iteration times has been reached or not, ending the iteration process if the specified number of iteration times has been reached, otherwise subtracting the bandwidth requests corresponding to which the connections have been established from the bandwidth requests existing in this iteration, excluding the logic source nodes and logic destination nodes between which the connections have been established, and restarting the iteration process.

In an example embodiment, the priorities of the virtual requests are determined according to at least one of the following: magnitudes of the bandwidth requests between the logic source nodes and logic destination nodes corresponding to the virtual requests, caching queue head queuing time of cached data which is sent to the corresponding logic destination nodes by the logic source nodes initiating the virtual requests and a guaranteed bandwidth threshold for the connections between the logic source nodes and logic destination nodes corresponding to the virtual requests.

In an example embodiment, the method further comprises: removing all the second logic destination nodes before bandwidth assignment is performed on a specified OB timeslot.

In an example embodiment, setting the one or more logic source nodes for each node comprises: setting one logic source node for each node.

In an example embodiment, setting the one or more logic source nodes for each node comprises: setting two logic source nodes for each node, comprising a first logic source node and a second logic source node, wherein the first logic source node is configured to establish connections with the destination nodes in the current DBA period, and the second logic source node is configured to reserve bandwidth resources for not-over-the-master-node connections established with downstream nodes in the next DBA period; when the iteration process is executed, sending, by the logic source nodes with the bandwidth requests existing in this iteration, the virtual requests to the logic destination nodes comprises: sending, by first logic source nodes with the bandwidth requests existing in this iteration, the virtual requests to the logic destination nodes, and sending, by the second logic source nodes with the bandwidth requests for the not-over-the-master-node connections existing in this iteration, the virtual requests to the second logic destination nodes; and discarding connections established by the second logic source nodes.

The embodiment of the disclosure further provides a device for bandwidth assignment of an OBRing, which may include:

an input component, configured to acquire current bandwidth resources, and exclude bandwidth resources occupied by over-the-master-node connections from the current bandwidth resources to obtain bandwidth resources to be assigned; and a bandwidth assignment component, configured to assign the bandwidth resources to be assigned to each node according to bandwidth requests of each node in the OBRing.

In an example embodiment, the bandwidth assignment component is configured to take one Optical Burst, OB, timeslot as a unit and perform the bandwidth assignment on OB timeslots one by one when the bandwidth resources to be assigned are assigned to each node; and the input component is configured to execute an operation of excluding the bandwidth resources occupied by the over-the-master-node connections from the current bandwidth resources before the bandwidth assignment is performed on each OB timeslot.

In an example embodiment, the input component is further configured to, before bandwidth assignment is performed, acquire the bandwidth requests in one Dynamic Bandwidth Assignment, DBA, period, and classify each bandwidth request of the bandwidth requests in the DBA period according to service levels to obtain one or more types of bandwidth requests, wherein, each type of bandwidth requests corresponds to one priority; and the bandwidth assignment component is further configured to sequentially perform one or more rounds of bandwidth assignment on each type of bandwidth requests consistent with a preset condition according to their priorities of the one or more types of bandwidth requests, wherein each round of bandwidth assignment corresponds to one type of bandwidth requests and bandwidth assignment being performed on OB timeslots one by one by taking one OB timeslot as a unit in each round of bandwidth assignment.

In an example embodiment, the bandwidth assignment component comprises a control element and an iteration element, wherein the control element is configured to, before the bandwidth assignment is performed on each OB timeslot, by a master node, set a logic destination node, called a first logic destination node, for the master node and an adjacent upstream node of the master node, set two logic destination nodes, respectively called the first logic destination node and a second logic destination node, for the other nodes except for the master node and the adjacent upstream node of the master node, wherein the first logic destination node is configured to establish a not-over-the-master-node connection with an upstream node of the first logic destination node and the second logic destination node is configured to establish an over-the-master-node connection with a downstream node of the second logic destination node, and set one or more logic source nodes for each node; the input component is further configured to, before bandwidth assignment is performed on each OB timeslot, acquire a destination node of an over-the-master-node connection in the current OB timeslot, and exclude the first logic destination node corresponding to the destination node of the over-the-master-node connection; and the iteration element is configured to, in each OB timeslot, look for and establish connections between the rest of logic source nodes and logic destination nodes according to bandwidth requests existing in the current timeslot, wherein the bandwidth requests existing in the current timeslot are determined based on the bandwidth requests according to which this round of bandwidth assignment is performed, bandwidth requests which are not met before this round of bandwidth assignment and bandwidth requests which have been met in timeslots on which bandwidth assignment has been performed in this round of bandwidth assignment.

In an example embodiment, the iteration unit is configured to perform the operation of looking for and establishing the connections between the rest of logic source nodes and logic destination nodes according to the bandwidth requests existing in the current timeslot in each OB timeslot comprises that: the following iteration process is executed: the logic source nodes with the bandwidth requests existing in this iteration send virtual requests to logic destination nodes, and specify priorities of the virtual requests, wherein the bandwidth requests existing in this iteration are the bandwidth requests existing in the current timeslot during the first iteration; the logic destination nodes select virtual requests with the highest priorities, and send virtual grants to the corresponding logic source nodes, which sends the virtual requests with the highest priorities, wherein priorities of the virtual grants are consistent with the priorities of the virtual requests upon which the virtual grants are responded; the logic source nodes select the virtual grants with the highest priorities, and establish connections with the corresponding logic destination nodes, which sends the virtual grants with the highest priorities; and whether a specified iteration number of times has been reached or not is judged, the iteration process ends if the specified number of iteration times has been reached, otherwise the bandwidth requests corresponding to which the connections have been established are subtracted from the bandwidth requests existing in this iteration, the logic source nodes and logic destination nodes between which the connections have been established are excluded, and the iteration process is restarted.

In an example embodiment, the iteration unit determines the priorities of the virtual requests according to at least one of the following: magnitudes of the bandwidth requests between the logic source nodes and logic destination nodes corresponding to the virtual requests, caching queue head queuing time of cached data which is sent to the corresponding logic destination nodes by the logic source nodes initiating the virtual requests and a guaranteed bandwidth threshold for the connections between the logic source nodes and logic destination nodes corresponding to the virtual requests.

In an example embodiment, the input component is further configured to remove all the second logic destination nodes before bandwidth assignment is performed on a specified OB timeslot.

In an example embodiment, the control element is configured to perform the operation of setting the one or more logic source nodes for each node comprises that: one logic source node is set for each node; or, two logic source nodes are set for each node, comprising a first logic source node and a second logic source node, wherein the first logic source node is configured to establish connections with the destination nodes in the current DBA period, and the second logic source node is configured to reserve bandwidth resources for not-over-the-master-node connections established with the downstream nodes in the next DBA period; when the iteration element executes the iteration process, the operation that the logic source nodes with the bandwidth requests existing in this iteration send the virtual requests to the logic destination nodes comprises that: the first logic source nodes with the bandwidth requests existing in this iteration send the virtual requests to the logic destination nodes, and the second logic source nodes with the bandwidth requests for the not-over-the-master-node connections existing in this iteration send the virtual requests to the second logic destination nodes; and connections established by the second logic source nodes are discarded.

From the technical solutions provided by the disclosure, the connections between multiple source nodes and multiple destination nodes are heuristically looked for and established with the specified priorities by OB timeslot by specified times of iteration in the embodiment of the disclosure, thereby fairly and effectively implementing bandwidth assignment in the OBRing. Specifically, adoption of the priorities ensures fairness between different connections. A heuristic iteration algorithm may greatly look for and establish the connections, so that the bandwidth resources may be effectively and completely utilized, and lower algorithm time complexity and easiness in implementation are achieved. An OB timeslot is taken as a basic unit for bandwidth assignment, and bandwidth assignment is performed on one or more OB timeslots one by one without requirements on lengths of optical fibres, so that higher networking flexibility is ensured, and the bandwidth assignment method is higher in universality; and a method for assigning bandwidths not by OB timeslot may cause limits of the lengths of the optical fibres and inconvenience in networking.

According to the embodiment of the disclosure, the bandwidth resources occupied by the over-the-master-node connections are excluded before bandwidth assignment is started, so that the problem of receiving conflict caused by the over-the-master-node service data connection is solved.

According to the embodiment of the disclosure, all the second logic destination nodes configured to establish the over-the-master-node connections with the downstream nodes are removed before bandwidth assignment is performed on a single specified OB timeslot, or two logic source nodes are set for each source node to reserve bandwidth resources for the not-over-the-master-node connections before bandwidth assignment is performed on each OB timeslot, so that it may be ensured that the bandwidth resources are fairly utilized between the over-the-master-node connections and the not-over-the-master-node connections.

According to the embodiment of the disclosure, the bandwidth requests are classified, and multiple rounds of bandwidth assignment are performed according to the priorities of the bandwidth requests, so that quality of service is distinctively ensured.

According to embodiments of the disclosure, two logic destination nodes are also set for each destination node during iteration, so that the same destination node may simultaneously establish the over-the-master-node connection and the not-over-the-master-node connection in the same OB timeslot, and the bandwidth resources can be effectively and completely utilized.

DETAILED DESCRIPTION OF THE EMBODIMENTS

Figure 1:
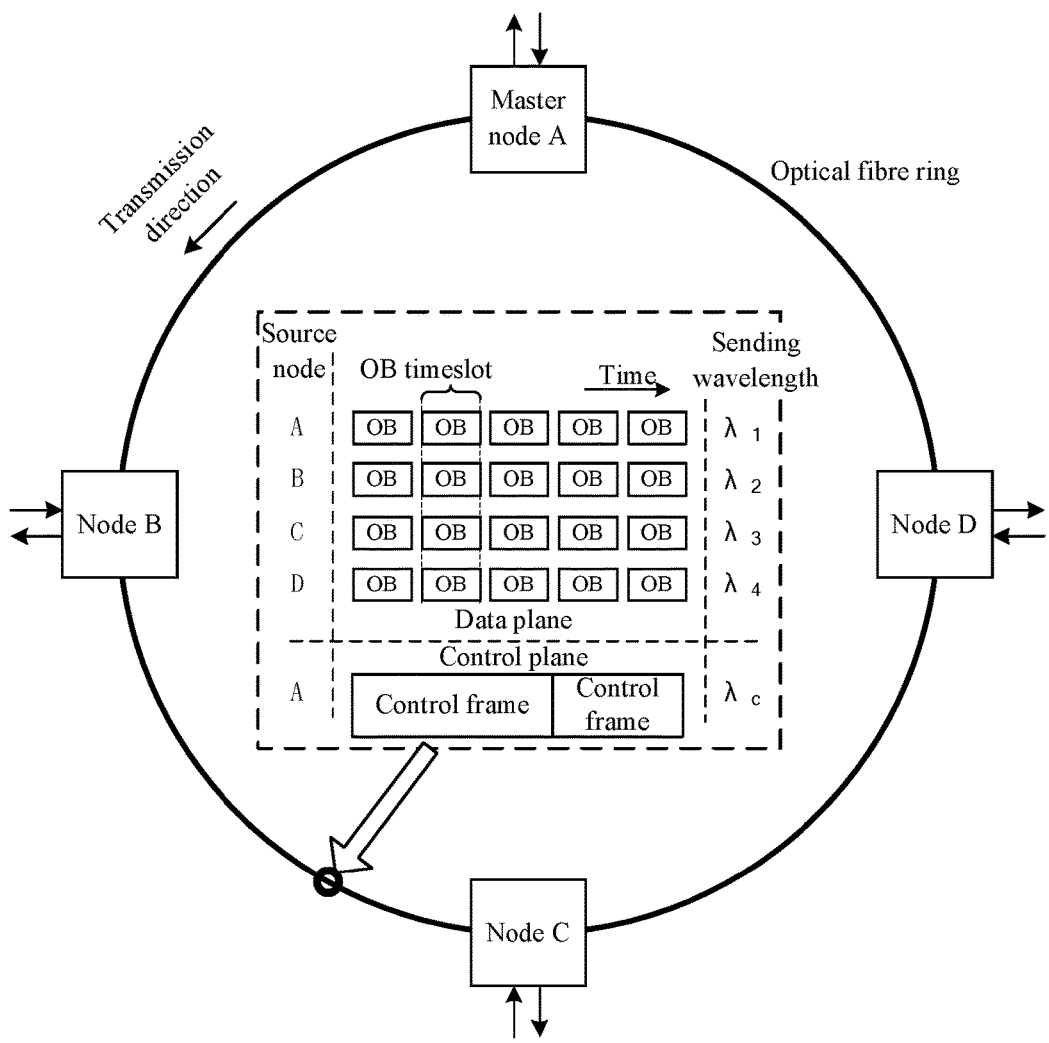
FIG. 1 is a ring structure and an exemplary running mechanism of an OBRing.
Figure 2:
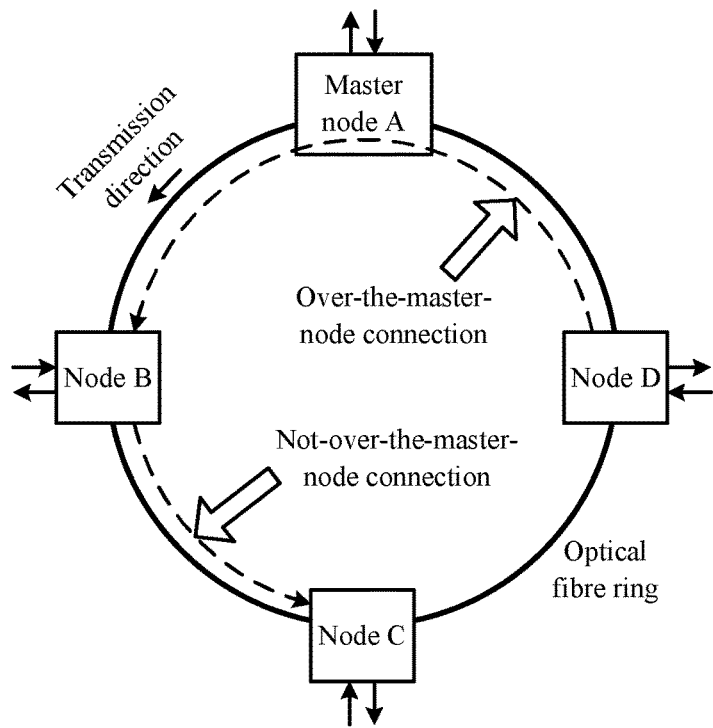
FIG. 2 is an over-the-master-node connection and not-over-the-master-node connection in an OBRing.
Figure 3:
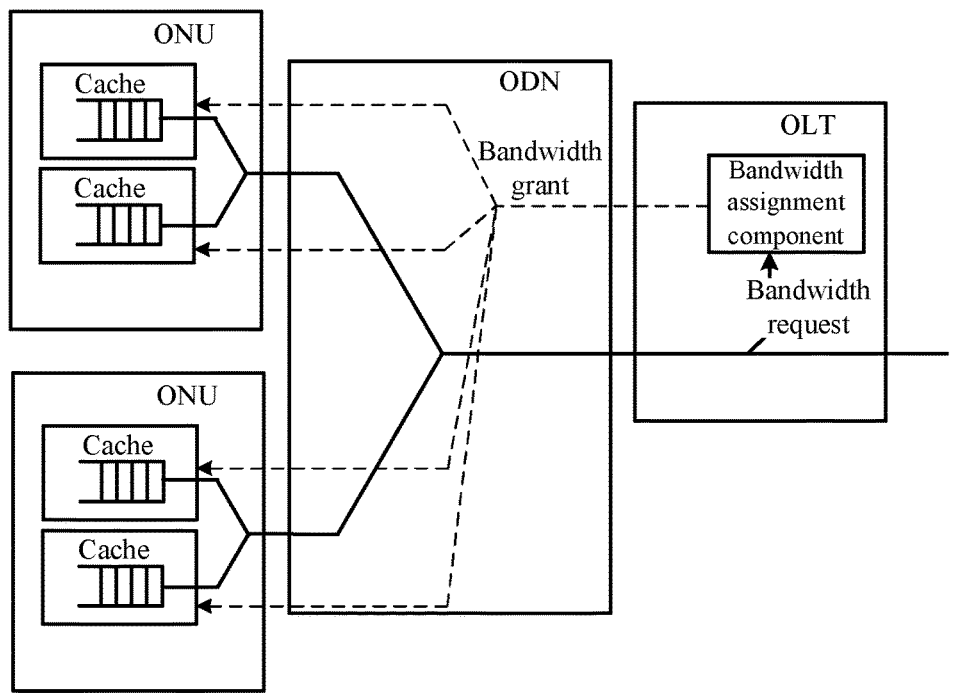
FIG. 3 is a treelike structure and an exemplary running mechanism of a PON according to the related art.
Figure 4:
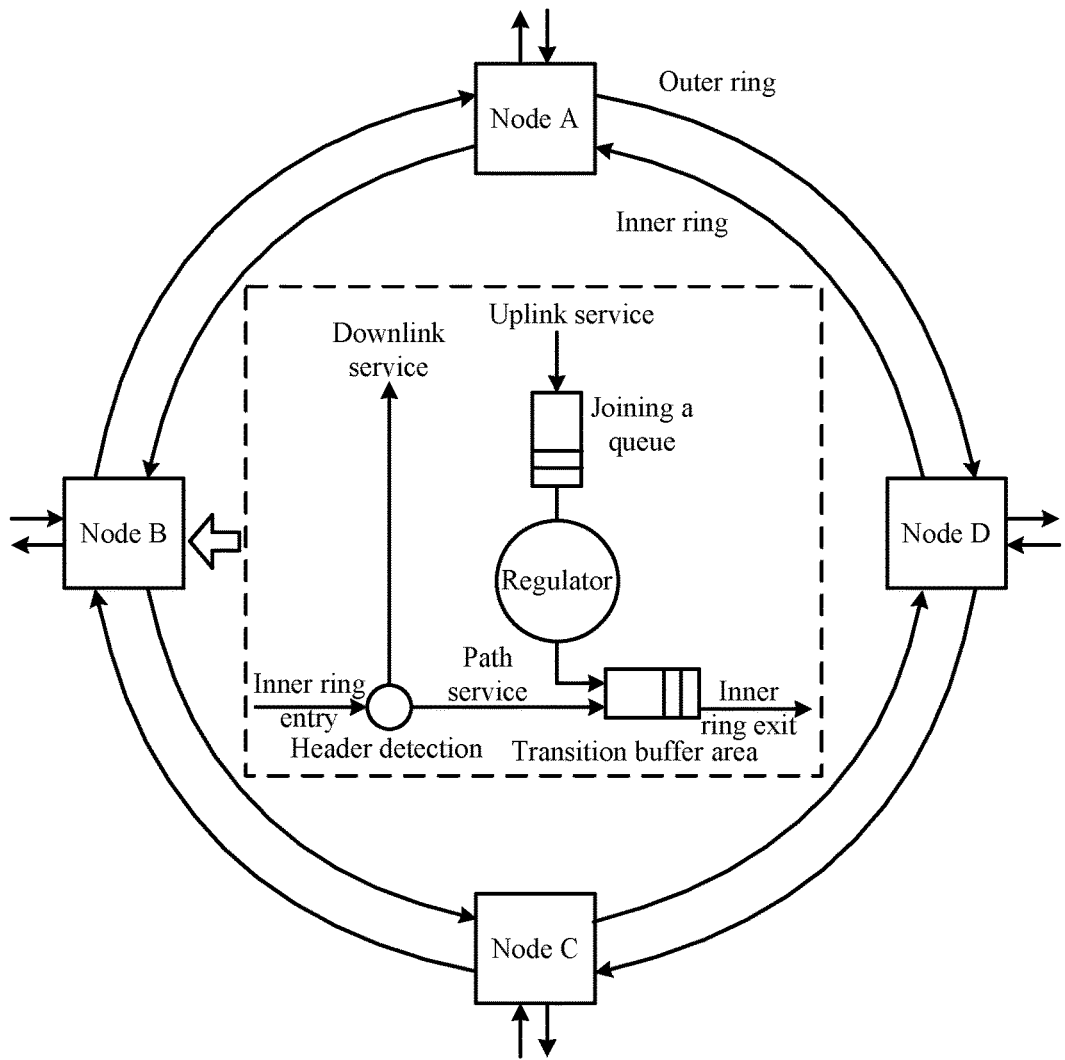
FIG. 4 is a schematic diagram of a ring structure and a node structural of an RPR according to the related art.
Figure 5:
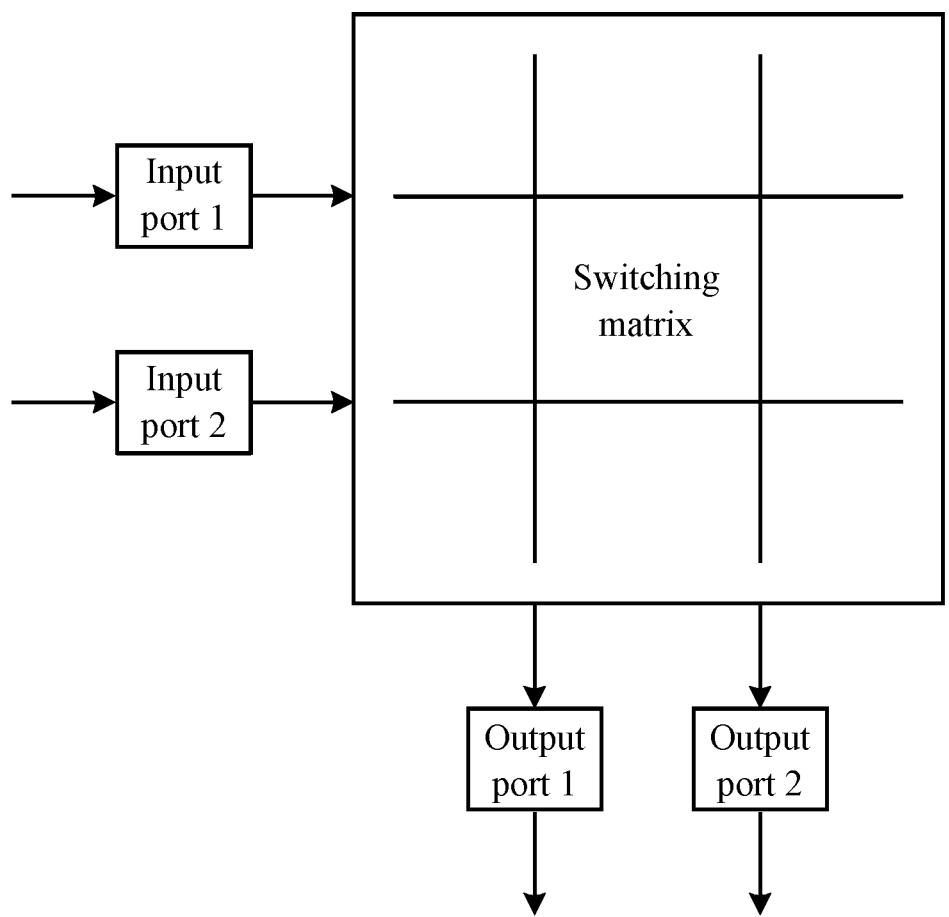
FIG. 5 is a structural diagram of a switching matrix according to the related art.

In order to make a purpose, technical solutions and advantages of the disclosure clearer, embodiments of the disclosure will be described below with reference to the drawings in detail. It is important to note that the embodiments in the disclosure and characteristics in the embodiments can be freely combined under the condition of no conflicts.

In addition, although logic sequences are shown in the flowcharts, shown or described steps may be executed in sequences different from the logic sequences under a certain condition.

The embodiment of the disclosure provides a method for bandwidth assignment of an OBRing, which includes that:

a master node acquires current bandwidth resources, and excludes bandwidth resources occupied by over-the-master-node connections from the current bandwidth resources to obtain bandwidth resources to be assigned; and the master node assigns the bandwidth resources to be assigned to each node according to bandwidth requests of each node in the OBRing.

Wherein, the master node takes an OB timeslot as a unit and performs the bandwidth assignment on OB timeslots one by one when the bandwidth resources to be assigned are assigned to each node, and executes an operation of excluding the bandwidth resources occupied by the over-the-master-node connections from the current bandwidth resources before the bandwidth assignment is performed on each OB timeslot.

Wherein, before the bandwidth assignment is performed, the master node acquires the bandwidth requests in a DBA period, classifies each bandwidth request of the bandwidth requests in the DBA period to obtain one or more types of bandwidth requests according to service levels, each type of bandwidth requests corresponding to a priority, and sequentially performs one or more rounds of bandwidth assignment on each type of bandwidth requests consistent with a preset condition according to priorities of the one or more types of bandwidth requests, each round of bandwidth assignment corresponding to one type of bandwidth requests and bandwidth assignment being performed on OB timeslots one by one by taking an OB timeslot as a unit in each round of bandwidth assignment. For example, the bandwidth requests may be divided into three types according to a fixed bandwidth threshold, a guaranteed bandwidth threshold and a maximum bandwidth threshold, wherein a first type includes bandwidth requests for bandwidths less than a sum of the fixed bandwidth threshold and the guaranteed bandwidth threshold, a second type includes additional bandwidth requests for bandwidths exceeding the sum of the fixed bandwidth threshold and the guaranteed bandwidth threshold and within the maximum bandwidth threshold, and a third type includes the requests for bandwidths exceeding the maximum bandwidth threshold. The first type and the second type are consistent with the preset condition, so that the master node only performs the bandwidth assignment on the first type of the bandwidth requests, i.e. the bandwidth requests for bandwidths within the fixed bandwidth threshold and guaranteed bandwidth threshold, and the second type of the bandwidth requests, i.e. the additional bandwidth requests, and does not perform bandwidth assignment on the bandwidth requests for bandwidths exceeding the maximum bandwidth threshold. Moreover, during assignment, according to the priorities, the bandwidth assignment is performed on the first type of bandwidth requests at first, and then the bandwidth assignment is performed on the second type of bandwidth requests. The above-mentioned classification manner is also taken as an example, and other classification manners may also be adopted according to a requirement, which is not limited in the disclosure. The preset condition may be set according to a requirement, and is not limited in the disclosure.

Wherein, before the bandwidth assignment is performed on each OB timeslot, the master node sets a logic destination node, called a first logic destination node, for the master node and an adjacent upstream node of the master node, sets two logic destination nodes, respectively called the first logic destination node and a second logic destination node, for the other nodes except for the master node and the adjacent upstream node of the master node, wherein the first logic destination node is configured to establish a not-over-the-master-node connection with an upstream node of the first logic destination node and the second logic destination node is configured to establish an over-the-master-node connection with a downstream node of the second logic destination node, and sets one or more logic source nodes for each node;

the step that the master node acquires the current bandwidth resources, and excludes the bandwidth resources occupied by the over-the-master-node connections from the current bandwidth resources includes that:

before bandwidth assignment is performed on each OB timeslot, the master node acquires a destination node of an over-the-master-node connection in the current OB timeslot, and excludes the first logic destination node corresponding to the destination node of the over-the-master-node connection; and the step that the master node assigns the bandwidth resources to be assigned to each node according to the bandwidth requests of each node in the OBRing includes that:

in each OB timeslot, the master node looks for and establishes connections between the rest of logic source nodes and logic destination nodes according to the bandwidth requests existing in the current timeslot, wherein the bandwidth requests existing in the current timeslot are determined based on the bandwidth requests according to which this round of bandwidth assignment is performed, bandwidth requests which are not met before this round of bandwidth assignment and bandwidth requests which have been met in timeslots on which bandwidth assignment has been performed in this round of bandwidth assignment. In a first timeslot, bandwidth requests existing in the current timeslot are a sum of the bandwidth requests according to which this round of bandwidth assignment is performed and the bandwidth requests which are not met before this round of bandwidth assignment; and bandwidth requests existing in a second timeslot are bandwidth requests obtained by subtracting the bandwidth requests which have been met in the first timeslot from the sum of the bandwidth requests according to which this round of bandwidth assignment is performed and bandwidth requests which are not met before this round of bandwidth assignment, namely by subtracting the bandwidth requests corresponding to which the connections have been established in the first timeslot, and the rest can be done in the same manner in subsequent timeslots.

Wherein, the step that in each OB timeslot, the master node looks for and establishes the connections between the rest of logic source nodes and logic destination nodes according to the bandwidth requests existing in the current timeslot includes that:

connections are established in an iteration manner, an iteration process including that:

logic source nodes of bandwidth requests existing in this iteration send virtual requests to logic destination nodes, and specify priorities of the virtual requests, wherein the bandwidth requests existing in this iteration are the bandwidth requests existing in the current timeslot during first iteration;

the logic destination nodes select the virtual requests with the highest priorities, and send virtual grants to the corresponding logic source nodes, which sends the virtual requests with the highest priorities, wherein priorities of the virtual grants are consistent with the priorities of the virtual requests upon which the virtual grants are responded;

the logic source nodes select the virtual grants with the highest priorities, and establish connections with the corresponding logic destination nodes, which sends the virtual grants with the highest priorities; and whether a specified number of iteration times has been reached or not is judged, the iteration process ends if the specified number of iteration times has been reached, otherwise the bandwidth requests corresponding to which the connections have been established are subtracted from the bandwidth requests existing in this iteration, the logic source nodes and logic destination nodes between which the connections have been established are excluded, and the iteration process is restarted.

Wherein, the priorities of the virtual requests are determined according to at least one of the following: magnitudes of the bandwidth requests between the logic source nodes and logic destination nodes corresponding to the virtual requests, caching queue head queuing time of cached data which is sent to the corresponding logic destination nodes by the logic source nodes initiating the virtual requests and a guaranteed bandwidth threshold for the connections between the logic source nodes and logic destination nodes corresponding to the virtual requests. Different guaranteed bandwidth thresholds may be adopted for different connections, and it may be set that priorities of virtual requests corresponding to connections with high guaranteed bandwidth thresholds are high, priorities of virtual requests corresponding to connections with low guaranteed bandwidth thresholds are low, and the like. In addition, it may be set that priorities corresponding to long caching queue head queuing time are high, priorities corresponding to short caching queue head queuing time are low, and the like. The priorities may also be determined by other parameters, which is not limited in the disclosure.

Wherein all the second logic destination nodes are removed before bandwidth assignment is performed on a specified OB timeslot.

Wherein, the step that the master node sets the one or more logic source nodes for each node includes that: one logic source node is set for each node.

Wherein, the step that the master node sets the one or more logic source nodes for each node includes that:

two logic source nodes are set for each node, including a first logic source node and a second logic source node, wherein the first logic source node is configured to establish the connections with the destination nodes in the current DBA period, and the second logic source node is configured to reserve bandwidth resources for the not-over-the-master-node connections established with downstream nodes in the next DBA period;

when the iteration process is executed, the step that the logic source nodes with the bandwidth requests existing in this iteration send the virtual requests to the logic destination nodes includes that: the first logic source nodes with the bandwidth requests existing in this iteration send the virtual requests to the logic destination nodes, and the second logic source nodes of the bandwidth requests for the not-over-the-master-node connections existing in this iteration send the virtual requests to the second logic destination nodes; and connections established by the second logic source nodes are discarded.

The disclosure will be further described below with an embodiment.

The method for bandwidth assignment of an OBRing in the disclosure includes the following steps that:

Step 1: the master node performs bandwidth assignment on OB timeslots one by one.

Furthermore, the master node acquires all the bandwidth requests in a DBA period and classifies the bandwidth requests according to a service level protocol before bandwidth assignment is performed on OB timeslots one by one.

Furthermore, the master node respectively performs multiple rounds of bandwidth assignment on the bandwidth requests corresponding to different service levels from bandwidth requests with higher priorities to bandwidth requests with lower priorities. Each round of bandwidth assignment is performed on OB timeslots in the DBA period one by one from a first OB timeslot to the last OB timeslot by taking an OB timeslot as a basic unit for bandwidth assignment. Particularly, when the priorities of all the bandwidth requests are the same, only one round of bandwidth assignment is performed. When the DBA period includes only one OB timeslot, bandwidth assignment is only required to be performed on this one OB timeslot in each round of bandwidth assignment.

Step 2: before bandwidth assignment is performed on a single OB timeslot, the master node excludes the bandwidth resources occupied by the over-the-master-node connections according to a first record. The first record includes related information about the over-the-master-node connections.

Furthermore, before bandwidth assignment is performed on each OB timeslot, two logic destination nodes are set for each destination node, wherein a first logic destination node is configured to establish the not-over-the-master-node connection with an upstream node, and a second logic destination node is configured to establish the over-the-master-node connection with an downstream node. Particularly, when the master node and an adjacent upstream node of the master node serve as destination nodes, it is only necessary to set one logic destination node (that is, only the first logic destination node is set). The master node removes first logic destination nodes occupied by the over-the-master-node connections according to the first record.

Furthermore, all the second logic destination nodes which establish the over-the-master-node connections with the downstream nodes are also required to be removed before bandwidth assignment is performed on a single specified OB timeslot, or two logic source nodes are set for each source node before bandwidth assignment is performed on each OB timeslot, wherein a first logic source node is configured to establish the connections with any destination node in the current DBA period, and a second logic source node is configured to reserve bandwidth resources for the not-over-the-master-node connections established with the downstream node in a next DBA period.

Step 3: during bandwidth assignment of a single OB timeslot, the master node heuristically looks for and establishes the connections between multiple source nodes and multiple destination nodes with the specified priorities by specified times of iteration.

Furthermore, a process of heuristically looking for and establishing the connections between logic source nodes and logic destination nodes in the master node is divided into three steps of requesting, granting and connection establishment. During requesting, each logic source node in the master node sends the virtual request to the corresponding logic destination node. During granting, the logic destination nodes select virtual requests with the highest priorities, and send virtual grants to the logic source nodes. During connection establishment, the logic source nodes select virtual grants with the highest priorities for connection establishment, and write results into bandwidth grants.

Step 4: after bandwidth assignment of all the OB timeslots is implemented, the master node makes the first record about the over-the-master-node connections.

Implementation of the technical solutions will be described hereinafter in detail with reference to the drawings.

Figure 6:
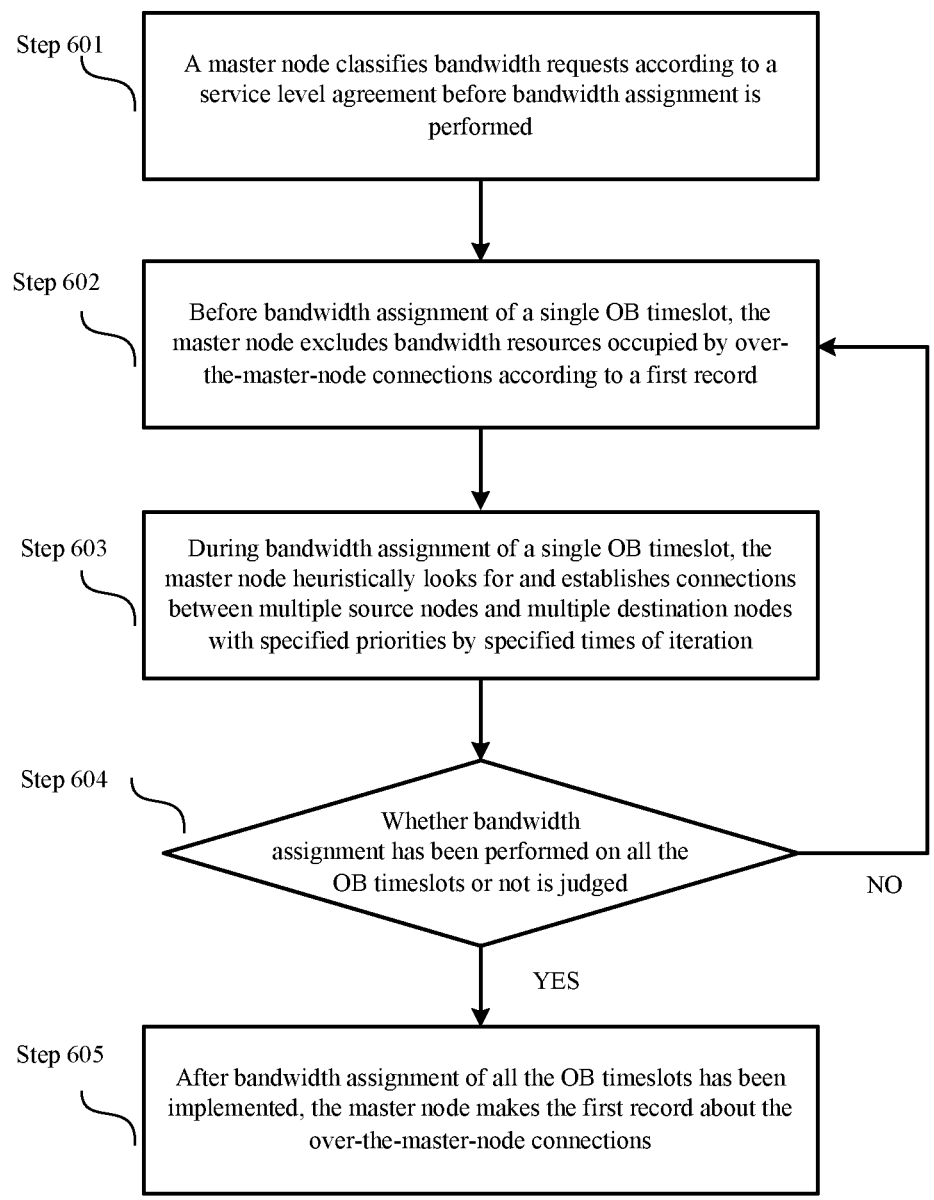
FIG. 6 is a flowchart of a method for bandwidth assignment according to the first embodiment of the disclosure.

FIG. 6 shows a flowchart of a method for bandwidth assignment of an OBRing according to an embodiment of the disclosure. The embodiment is based on a ring structure shown in FIG. 1, and an executed object of the method is a master node. Referring to FIG. 6, the embodiment specifically includes:

Step 601: the master node classifies bandwidth requests according to a service level protocol before bandwidth assignment is performed.

Specifically, the master node reads input parameters such as all the bandwidth requests in a DBA period, the number of nodes, a first record recording over-the-master-node connections, the number of OB timeslots on which assignment may be performed in a single DBA period and a maximum bandwidth threshold. In the embodiment, a single DBA period includes only one OB timeslot.

Specifically, the master node classifies the bandwidth requests according to the maximum bandwidth threshold. The master node classifies each bandwidth request into two parts according to the maximum bandwidth threshold. One part includes bandwidth requests for bandwidths within the maximum bandwidth threshold, and the other part includes bandwidth requests for bandwidths exceeding the maximum bandwidth threshold. The master node only performs bandwidth assignment on bandwidth requests for bandwidths within the maximum bandwidth threshold, and does not perform bandwidth assignment on bandwidth requests for bandwidths exceeding the maximum bandwidth threshold.

Specifically, the master node performs bandwidth assignment on the only one OB timeslot included in the current DBA period according to the input parameters by taking an OB timeslot as a basic unit for bandwidth assignment by virtue of the bandwidth requests for bandwidths within the maximum bandwidth threshold. Bandwidth assignment is implemented by Step 602 and Step 603.

Step 602: before bandwidth assignment of a single OB timeslot, the master node excludes bandwidth resources occupied by the over-the-master-node connections according to the first record.

Specifically, before bandwidth assignment is performed on each OB timeslot, two logic destination nodes, respectively called a first logic destination node and a second logic destination node, are set for each destination node, wherein the first logic destination node is configured to establish not-over-the-master-node connection with an upstream node, and the second logic destination node is configured to establish the over-the-master-node connection with a downstream node. Particularly, when the master node and an adjacent upstream node of the master node serve as destination nodes, it is only necessary to set one logic destination node (that is, only the first logic destination node is set).

The master node searches the first record for the over-the-master-node connections of the current OB timeslot, finds destination nodes of the over-the-master-node connections, and removes first logic destination nodes, configured to establish the not-over-the-master-node connections with upstream nodes, of the destination nodes. It needs to be noted that the first logic destination nodes are removed because the not-over-the-master-node connections established between the other nodes and the first logic destination nodes may conflict with the over-the-master-node connections in the first record.

Furthermore, before bandwidth assignment is performed on a single OB timeslot, all the second logic destination nodes which establish the over-the-master-node connections with the downstream nodes are removed at an interval of a specified number of OB timeslots or DBA periods. This is because not establishing the not-over-the-master-node connections are unfair for the not-over-the-master-node connections and may cause starvation of the not-over-the-master-node connections when, as mentioned in previous paragraph, the not-over-the-master-node connections conflict with the over-the-master-node connections in the first record. Therefore, the over-the-master-node connections are not established to reserve bandwidth resources for the not-over-the-master-node connections to prevent starvation at an interval of a specified number of OB timeslots during bandwidth assignment. The specified number may be set according to a requirement. Or, the over-the-master-node connections are not established during bandwidth assignment in a specified OB timeslot.

Step 603: during bandwidth assignment of a single OB timeslot, the master node heuristically looks for and establishes the connections between multiple source nodes and multiple destination nodes with the specified priorities by specified times of iteration.

Specifically, an iteration includes three steps of requesting, granting and connection establishment. Each iteration may establish connections between part of logic source nodes and logic destination nodes. Each iteration continuously adds new connections on the basis of the previous iteration. The master node implements bandwidth assignment of one OB timeslot by specified times of iteration, wherein, a value of iteration times is 1~N, and N is the number of nodes of the OBRing. In an example embodiment, when iteration times is $\log_2^N$, bandwidth resources in an OB timeslot may be completely utilized, that is, as many destination nodes as possible may be arranged for one or more source nodes in one OB timeslot to enable the one or more source nodes to send an OB in this one OB timeslot. Step 701 to Step 703 corresponds to the three steps of requesting, granting and connection establishment.

Heuristically establishing the connections by iteration may reduce time complexity of the method for bandwidth assignment and facilitate implementation of the method for bandwidth assignment provided by the embodiment of the disclosure.

Step 604: whether bandwidth assignment has been performed on all the OB timeslots or not is judged. Specifically, the master node obtains the total number of OB timeslots according to the number of OB timeslots on which assignment may be performed in a single DBA period in the input parameters. If the number of the OB timeslots on which bandwidth assignment has been performed is smaller than the total number of the OB timeslots, the master node returns to execute Step 602; and if the number of the OB timeslots on which bandwidth assignment has been performed is equal to the total number of the OB timeslots, Step 605 is executed.

In the embodiment, a single DBA period includes only one OB timeslot, so that bandwidth assignment has been performed on all the OB timeslot, and Step 605 is executed.

Step 605: after bandwidth assignment of all the OB timeslots has been implemented, the master node makes the first record about the over-the-master-node connections.

Specifically, the master node outputs bandwidth grants and makes the first record about the over-the-master-node connections after implementing bandwidth assignment of all the OB timeslots one by one. The bandwidth grants at least include that each source node should send OBs to which destination nodes in each OB timeslot. The first record about the over-the-master-node connections includes whether all the destination nodes in all the OB timeslots connected end to end in a circle around a ring have the over-the-master-node connections or not. Wherein, Step 605 may be eliminated, and in Step 602, the master node determines the over-the-master-node connections at first, and then excludes the bandwidth resources occupied by the over-the-master-node connections.

Figure 7:
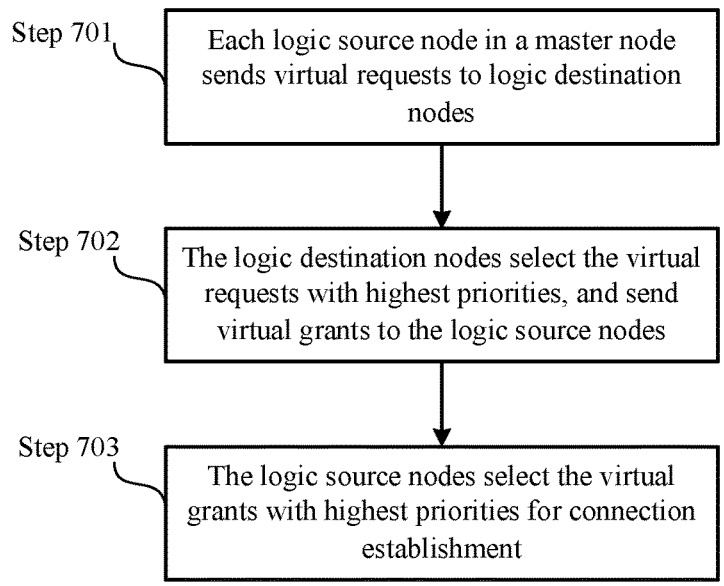
FIG. 7 is another flowchart of a method for bandwidth assignment according to the first embodiment of the disclosure.

FIG. 7 is another flowchart of a method for bandwidth assignment of an OBRing according to an embodiment of the disclosure. Execution steps of single iteration in Step 603 are described in detail. The embodiment is based on the ring structure shown in FIG. 1, and the executed object of the method is the master node. Referring to FIG. 7, the embodiment specifically includes:

Step 701: each logic source node in the master node sends virtual requests to logic destination nodes.

Specifically, after iteration is started, logic source nodes with the bandwidth requests in the master node send the virtual requests to the logic destination nodes according to temporary bandwidth requests. The same logic source node may simultaneously send the virtual request to multiple logic destination nodes. In the embodiment, bandwidth requests for bandwidths within the maximum bandwidth threshold are copied to generate the temporary bandwidth requests before first iteration is started in a first OB timeslot in a DBA period.

Step 702: the logic destination nodes select virtual requests with highest priorities, and send virtual grants to the logic source nodes, which send the virtual requests with the highest priorities.

Specifically, the logic destination nodes receive virtual requests sent by one or more logic source nodes. The logic destination nodes select the virtual requests with the highest priorities, and send the virtual grants to the source nodes sending the virtual requests with the highest priorities. In the embodiment, magnitudes of bandwidths of temporary bandwidth requests are adopted as the priorities of the virtual requests, the priorities of the virtual requests may also be measured by virtue of parameters such as queue head queuing time and guaranteed bandwidth threshold or by combining different parameters, which is not limited in the disclosure, and the corresponding parameters may be used as the priorities of the virtual requests according to a requirement. Bandwidth assignment is performed according to the priorities, so that the method for bandwidth assignment provided by the disclosure is also suitable for an application scenario where different nodes correspond to different service levels and service traffic is distributed non-uniformly.

Step 703: the logic source nodes select the virtual grants with the highest priorities for connection establishment.

Specifically, the logic source nodes receive the virtual grants sent by one or more logic destination nodes. The logic source nodes select the virtual grants with the highest priorities, establish the connections between the logic source nodes and the logic destination nodes sending the virtual grants with the highest priorities, and write all the established connections into bandwidth grants. In the embodiment, the priorities of the virtual grants are measured by magnitudes of bandwidths of the virtual requests, the priorities are higher if the bandwidths are larger, the priorities are lower if the bandwidths are smaller, and the priorities may also be measured by virtue of parameters such as the queue head queuing time and the guaranteed bandwidth threshold or by combining different parameters. Sending of the virtual requests and reception of the virtual grants in each step are implemented by an internal logic of the master node, and do not involve specific signalling or control frame interaction.

Furthermore, after the connections are established, the temporary bandwidth requests are updated, and the magnitudes of the requests corresponding to which the connections have been established are subtracted from the temporary bandwidth requests. After the temporary bandwidth requests are updated, iteration is implemented once, the next iteration is performed, and logic source nodes and logic destination nodes between the connections have been established will not participate in iteration.

Figure 8:
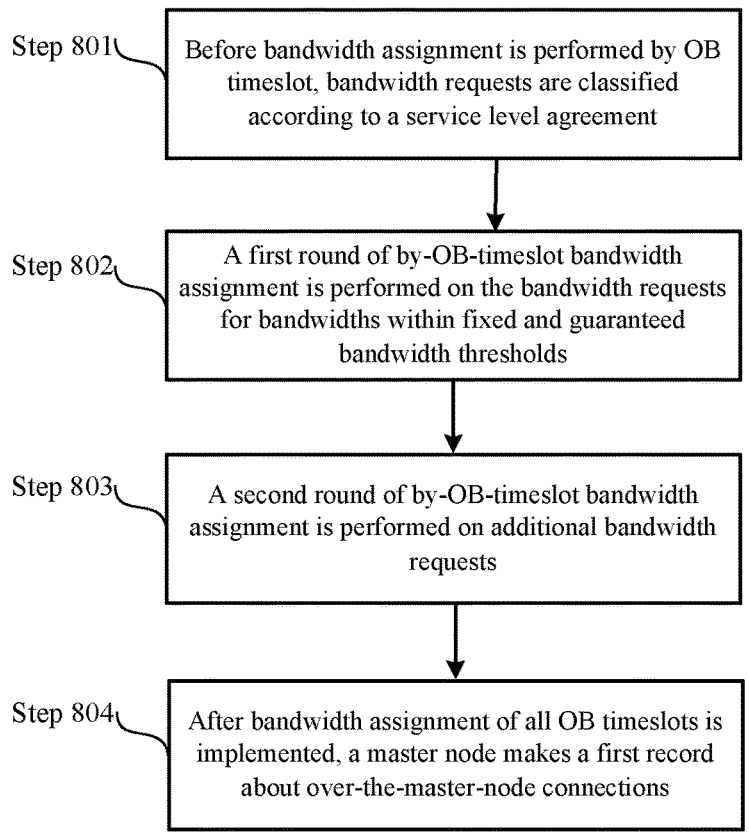
FIG. 8 is a flowchart of a method for bandwidth assignment according to the second embodiment of the disclosure.

FIG. 8 is a flowchart of a method for bandwidth assignment of an OBRing according to another embodiment of the disclosure. The embodiment is based on a ring structure shown in FIG. 1, and an executed object of the method is a master node. Referring to FIG. 8, the embodiment specifically includes:

Step 801: before bandwidth assignment is performed on OB timeslots one by one, bandwidth requests are classified according to a service level protocol.

Specifically, the master node reads input parameters such as all the bandwidth requests in a DBA period, the number of nodes, a first record recording over-the-master-node connections, the number of OB timeslots on which assignment may be performed in a single DBA period, a fixed bandwidth threshold, a guaranteed bandwidth threshold and a maximum bandwidth threshold. In the embodiment, one DBA period includes multiple OB timeslots.

Specifically, the master node classifies the bandwidth requests to divide each bandwidth request into three parts according to the fixed bandwidth threshold, the guaranteed bandwidth threshold and the maximum bandwidth threshold. The first part includes the bandwidth requests for bandwidths less than a sum of the fixed and guaranteed bandwidth thresholds, the second part includes additional bandwidth requests for bandwidths exceeding the sum of the fixed and guaranteed bandwidth thresholds and within the maximum bandwidth threshold, and the third part includes the requests for bandwidths exceeding the maximum bandwidth threshold. The master node performs bandwidth assignment on the first part of bandwidth requests for bandwidths within the fixed and guaranteed bandwidth thresholds and the second part of additional bandwidth requests, and does not perform bandwidth assignment on the third part of bandwidth requests for bandwidths exceeding the maximum bandwidth threshold.

Specifically, the master node performs first round of bandwidth assignment on the OB timeslots one by one to the first part of bandwidth requests with higher priorities according to Step 802, and then performs second round of bandwidth assignment on the OB timeslots one by one to the second part of bandwidth request with lower priorities according to Step 803. Each round of bandwidth assignment is performed on the OB timeslots one by one from a first OB timeslot to a last timeslot by taking an OB timeslot as a basic unit for bandwidth assignment, that is, destination nodes to which each source node in the first OB timeslot sends OBs are determined at first, and then the second OB timeslot is arranged, till the last OB timeslot. Bandwidth assignment is sequentially performed on the bandwidth requests with different priorities, so that quality of service is distinctively ensured.

Step 802: the first round of bandwidth assignment on the OB timeslots one by one is performed on the bandwidth requests for bandwidths within the fixed and guaranteed bandwidth thresholds.

Specifically, the master node repeatedly executes the following operation from the first OB timeslot of the current DBA period until bandwidth assignment has been performed on all the OB timeslots: the similarity with Step 602 is that, before bandwidth assignment is performed on a single OB timeslot, the master node excludes bandwidth resources occupied by the over-the-master-node connections according to the first record; the difference from Step 602 is that all second logic destination nodes configured to establish the over-the-master-node connections with downstream nodes are removed before bandwidth assignment of any OB timeslot; the similarity with Step 603 is that, during bandwidth assignment of a single OB timeslot, the master node heuristically looks for and establishes connections between multiple source nodes and multiple destination nodes with the priorities of the bandwidth requests by specified times of iteration; and the similarity with Step 604 is that whether bandwidth assignment has been performed on all the OB timeslots or not is judged. In the embodiment, magnitudes of bandwidths of temporary bandwidth requests are used as the priorities during iteration, and parameters such as queue head queuing time and the guaranteed bandwidth threshold may also be used or different parameters may also be combined as the priorities.

Particularly, in the embodiment, the temporary bandwidth requests are obtained by adding the bandwidth requests for bandwidths within the fixed and guaranteed bandwidth thresholds and fixed and guaranteed bandwidth requests which are not met before the abovementioned operation is started. The temporary bandwidth requests are used for iteration.

Furthermore, after performing bandwidth assignment on all the OB timeslots, the master node compares bandwidth grants with the bandwidth requests for bandwidths within the fixed and guaranteed bandwidth thresholds to determine the fixed and guaranteed bandwidth requests which are not met, and updates the fixed and guaranteed bandwidth requests which are not met.

Step 803: the second round of bandwidth assignment on the OB timeslots one by one is performed on the additional bandwidth requests.

The similarity with Step 802 is that the master node repeatedly executes the following operation from the first OB timeslot of the current DBA period until bandwidth assignment has been performed on all the OB timeslots: the similarity with Step 602 is that, before bandwidth assignment is performed on a single OB timeslot, the master node excludes the bandwidth resources occupied by the over-the-master-node connections according to the first record; the difference from Step 602 is that, before bandwidth assignment of a single timeslot, two logic source nodes are set for each source node, wherein the first logic source node is configured to establish connections with any destination nodes in the current DBA period and the second logic source node is configured to reserve bandwidth resources for not-over-the-master-node connections established with the downstream nodes in the next DBA period, and the bandwidth requests in the DBA period are assigned to the second logic source nodes during iteration, so that the bandwidth resources are reserved for the not-over-the-master-node connections, and the bandwidth resources may be fairly utilized between the over-the-master-node connections and the not-over-the-master-node connections; the similarity with Step 603 is that, during bandwidth assignment of a single OB timeslot, the master node heuristically looks for and establishes connections between multiple source nodes and multiple destination nodes with the specified priorities by specified times of iteration; and the similarity with Step 604 is that whether bandwidth assignment has been performed on all the OB timeslots or not is judged. In the embodiment, the magnitudes of the bandwidths of the temporary bandwidth requests are used as the priorities during iteration, and parameters such as the queue head queuing time and the guaranteed bandwidth threshold may also be used or different parameters may also be combined as the priorities.

The difference from Step 802 is that, in the embodiment, the temporary bandwidth requests are obtained by adding the additional bandwidth requests and the fixed and guaranteed bandwidth requests which are not met before the abovementioned operation is started. The temporary bandwidth requests are used for iteration.

The difference from Step 802 is that, after bandwidth assignment is performed on all the OB timeslots, the master node compares bandwidth grants added in the second round of bandwidth assignment with the fixed and guaranteed bandwidth requests which are not met to determine fixed and guaranteed bandwidth requests which are still not met after the second round of bandwidth assignment, and updates the fixed and guaranteed bandwidth requests which are not met.

Step 804: after bandwidth assignment of all the OB timeslots is implemented, the master node makes the first record about the over-the-master-node connections.

The similarity with Step 605 is that, after bandwidth assignment of all the OB timeslots is implemented one by one, the master node outputs the bandwidth grants and makes the first record about the over-the-master-node connections. The bandwidth grants at least include that each source node should send one or more OBs to which destination nodes in each OB timeslot. The first record about the over-the-master-node connections includes whether all the destination nodes in all the OB timeslots connected end to end in a circle around a ring have the over-the-master-node connections or not. The difference from Step 605 is that the connections established by the second logic source nodes in Step 803 are not written into the bandwidth grants.

Figures 9, 10:
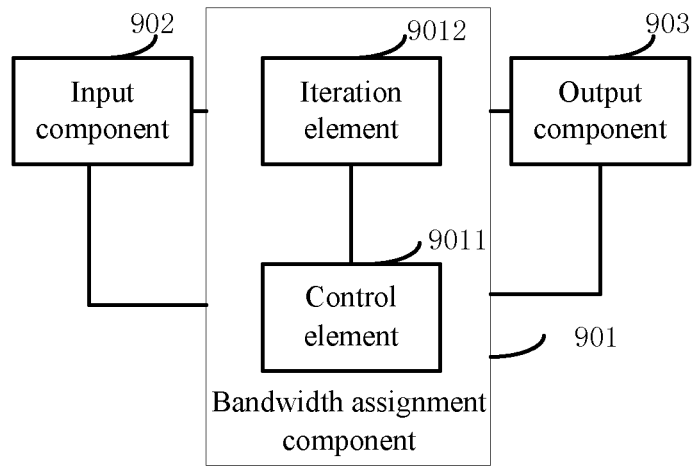
FIG. 9 is a structural diagram of a device for bandwidth assignment according to the third embodiment of the disclosure.
FIG. 10 is a typical matrix in a method for bandwidth assignment according to the third embodiment of the disclosure.

FIG. 9 is a structural diagram of a device for bandwidth assignment according to an embodiment of the disclosure. Referring to FIG. 9, the device includes:

an input component 902, configured to acquire current bandwidth resources, and exclude bandwidth resources occupied by over-the-master-node connections from the current bandwidth resources to obtain bandwidth resources to be assigned; and a bandwidth assignment component 901, configured to assign the bandwidth resources to be assigned to each node according to bandwidth requests of each node in an OBRing.

In an optional solution of the embodiment, the bandwidth assignment component 901 is configured to take an OB timeslot as a unit and perform the bandwidth assignment on OB timeslots one by one when the bandwidth resources to be assigned are assigned to each node; and the input component 902 is configured to execute an operation of excluding the bandwidth resources occupied by the over-the-master-node connections from the current bandwidth resources before the bandwidth assignment is performed on each OB timeslot.

In an optional solution of the embodiment, the input component is further configured to: before bandwidth assignment is performed, acquire the bandwidth requests in a DBA period, and classify each bandwidth request of the bandwidth requests in the DBA period to obtain one or more types of bandwidth requests according to service levels, each type of bandwidth requests corresponding to a priority; and the bandwidth assignment component 901 is further configured to sequentially perform one or more rounds of bandwidth assignment on each type of bandwidth requests consistent with a preset condition according to their priorities of the one or more types of bandwidth requests, each round of bandwidth assignment corresponding to one type of bandwidth requests and bandwidth assignment being performed on OB timeslots one by one by taking an OB timeslot as a unit in each round of bandwidth assignment. The bandwidth assignment component 901 includes a control unit 9011 and an iteration unit 9012, wherein the control element 9011 is configured to, before the bandwidth assignment is performed on each OB timeslot, by a master node, set a logic destination node, called a first logic destination node, for the master node and an adjacent upstream node of the master node, set two logic destination nodes, respectively called the first logic destination node and a second logic destination node, for the other nodes except for the master node and the adjacent upstream node of the master node, wherein the first logic destination node is configured to establish a not-over-the-master-node connection with an upstream node of the first logic destination node and the second logic destination node is configured to establish an over-the-master-node connection with a downstream node of the second logic destination node, and set one or more logic source nodes for each node;

the input component 902 is further configured to, before bandwidth assignment is performed on each OB timeslot, acquire a destination node of an over-the-master-node connection in the current OB timeslot, and exclude the first logic destination node corresponding to the destination node of the over-the-master-node connection; and the iteration element 9012 is configured to, in each OB timeslot, look for and establish connections between the rest of logic source nodes and logic destination nodes according to the bandwidth requests existing in the current timeslot, wherein the bandwidth requests existing in the current timeslot are determined based on the bandwidth requests according to which this round of bandwidth assignment is performed, bandwidth requests which are not met before this round of bandwidth assignment and bandwidth requests which have been met in timeslots on which bandwidth assignment has been performed in this round of bandwidth assignment.

In an optional solution of the embodiment, the iteration unit 9012 is configured to perform the operation of looking for and establishing the connections between the rest of logic source nodes and logic destination nodes according to the bandwidth requests existing in the current timeslot in each OB timeslot includes that:

the following iteration process is executed:

the logic source nodes with the bandwidth requests existing in this iteration send virtual requests to logic destination nodes, and specify priorities of the virtual requests, wherein the bandwidth requests existing in this iteration are the bandwidth requests existing in the current timeslot during first iteration;

the logic destination nodes select the virtual requests with the highest priorities, and send virtual grants to the corresponding logic source nodes, which sends the virtual requests with the highest priorities, wherein priorities of the virtual grants are consistent with the priorities of the virtual requests upon which the virtual grants are responded;

the logic source nodes select the virtual grants with the highest priorities, and establish connections with the corresponding logic destination nodes, which sends the virtual grants with the highest priorities; and whether a specified number of iteration times has been reached or not is judged, the iteration process ends if the specified number of iteration times has been reached, otherwise the bandwidth requests corresponding to which the connections have been established are subtracted from the bandwidth requests existing in this iteration, the logic source nodes and logic destination nodes between which the connections have been established are excluded, and the iteration process is restarted.

In an optional solution of the embodiment, the iteration unit 9012 determines the priorities of the virtual requests according to at least one of the following: magnitudes of the bandwidth requests between the logic source nodes and logic destination nodes corresponding to the virtual requests, caching queue head queuing time of cached data which is sent to the corresponding logic destination nodes by the logic source nodes initiating the virtual requests and a guaranteed bandwidth threshold for the connections between the logic source nodes and logic destination nodes corresponding to the virtual requests.

In an optional solution of the embodiment, the input component 902 is may further configured to remove all the second logic destination nodes before bandwidth assignment is performed on a specified OB timeslot.

In an optional solution of the embodiment, the control element is configured to perform the operation of setting the one or more logic source nodes for each node comprises that:
one logic source node is set for each node;
or,
two logic source nodes are set for each node, including a first logic source node and a second logic source node, wherein the first logic source node is configured to establish the connections with the destination nodes in the current DBA period, and the second logic source node is configured to reserve bandwidth resources for the not-over-the-master-node connections established with the downstream nodes in the next DBA period;
when the iteration element executes the iteration process, the operation that the logic source nodes with the bandwidth requests existing in this iteration send the virtual requests to the logic destination nodes includes that: the first logic source nodes with the bandwidth requests existing in this iteration send the virtual requests to the logic destination nodes, and the second logic source nodes with the bandwidth requests for the not-over-the-master-node connections existing in this iteration send the virtual requests to the second logic destination nodes; and moreover, connections established by the second logic source nodes are discarded.

In an optional solution of the embodiment, the device may further include an output component 903, configured to, after bandwidth assignment of all the OB timeslots is implemented, record and store the over-the-master-node connections as a first record.

Specifically, the output component 903 is configured to, after bandwidth assignment of all the OB timeslots is implemented on OB timeslots one by one, output the bandwidth grants and record the over-the-master-node connections. The bandwidth grants at least include that each source node should send one or more OBs to which destination nodes in each OB timeslot. The first record about the over-the-master-node connections includes whether all the destination nodes in all the OB timeslots connected end to end in a circle around a ring have the over-the-master-node connections or not.

It needs to be noted that multiple details described in the abovementioned method embodiments are also applicable to the device embodiments, so that repeated description about the same or similar parts is omitted.

The disclosure is further described below with a specific application example.

FIG. 10 is an example of three types of matrixes in a method for bandwidth assignment of an OBRing according to a specific embodiment when the OBRing consists of four nodes and 8 OB timeslots may be scheduled in a single DBA period. Referring to FIG. 10, the three types of matrixes include:

a matrix 1001, configured to record bandwidth requests of different connections, wherein rows represent source nodes, columns represent destination nodes, and elements of the matrix represent magnitudes of the bandwidth requests of the connections; for example, element 4 in a third row and a second column represents that a source node C makes a request of establishing a connection to a destination node B and sends service data of 4 OBs; all types of bandwidth requests involved in the method for bandwidth assignment of the OBRing according to the embodiment of the disclosure may be recorded by adopting a format of the matrix, specifically including fixed and guaranteed bandwidth requests, additional bandwidth requests, temporary bandwidth requests, fixed and guaranteed bandwidth requests which are not met and the like; particularly, if each node does not support self-sending and self-receiving, elements on diagonals of the matrix are practically meaningless;

a matrix 1002, configured to record whether bandwidths of all the destination nodes in all OB timeslots connected end to end in a circle around a ring are occupied by over-the-master-node connections or not, wherein there are totally 8 OB timeslots connected end to end in a circle around the ring in the embodiment; in the matrix, rows represent the destination nodes, columns represent OB timeslot numbers, it is indicated that the destination node is occupied when an element of the matrix is 1, and it is indicated that the destination node is idle when an element of the matrix is 0; for example, element 1 in a third row and a fifth column represents that a fifth OB timeslot of a destination node C has been occupied by an over-the-master-node connection; the matrix 1002 is updated every time when new bandwidth grants are generated, and is used when bandwidth grants are made next time; and a matrix 1003, configured to record information about the bandwidth grants made by a master node, wherein, in the matrix, rows represent the source nodes, columns represent the OB timeslot numbers, and elements of the matrix represent the destination nodes; and for example, element B in a third row and a eighth column represents that node C should send an OB of service data to node B in an eighth OB timeslot.

Another example embodiment of the disclosure provides a method for bandwidth assignment of an OBRing. The embodiment is based on a ring structure shown in FIG. 1, and an executed object of the method is a master node, the embodiment including:

Step 1110: before bandwidth assignment is performed on OB timeslots one by one, bandwidth requests are classified according to a service level protocol.

Specifically, before starting bandwidth assignment, the master node acquires the bandwidth requests of all nodes in a previous DBA period, and reads configuration information and the like. In the embodiment, the acquired bandwidth requests are shown in the matrix 1001. There are totally 4 nodes on a ring, 8 OB timeslots may be scheduled in a single DBA period, and there are totally 8 OB timeslots connected end to end in a circle around the ring. Over-the-master-node connections still occupying bandwidths are shown in the matrix 1002, and a fixed bandwidth threshold, a guaranteed bandwidth threshold and a maximum bandwidth threshold are respectively set into 1, 1 and 4 OBs. The embodiment is simplified in a manner that each connection has the same fixed bandwidth threshold, the same guaranteed bandwidth threshold and the same maximum bandwidth threshold. In another embodiment, each connection may have different fixed bandwidth thresholds, different guaranteed bandwidth thresholds and different maximum bandwidth thresholds. During classification, it is necessary to classify the bandwidth requests according to the thresholds corresponding to each connection.

Figure 11:
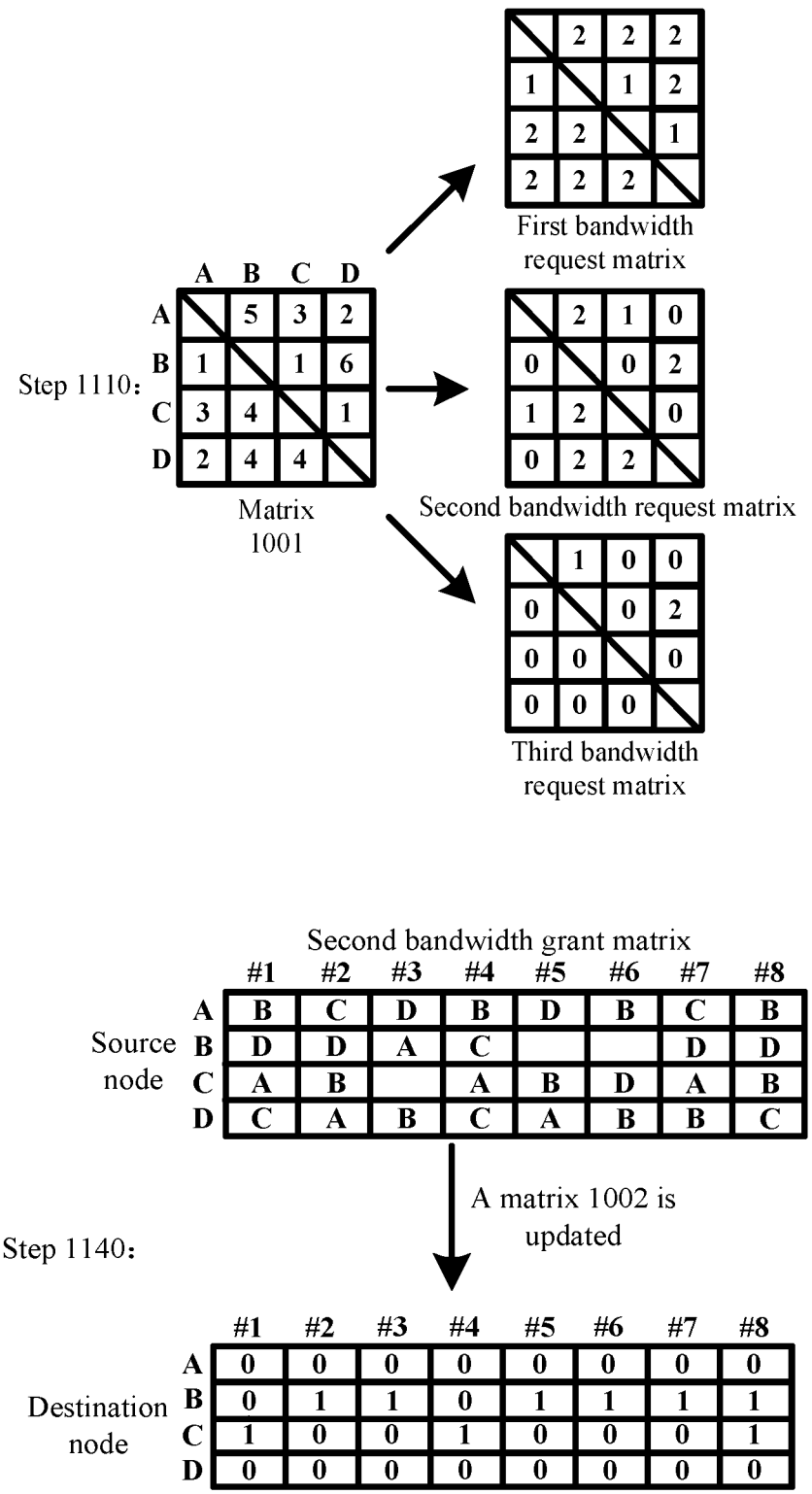
FIG. 11 is a schematic diagram of a method for bandwidth assignment according to the fourth embodiment of the disclosure.

Furthermore, as shown in FIG. 11, the master node divides the matrix 1001 into three new bandwidth request matrixes, including a first bandwidth request matrix, a second bandwidth request matrix and a third bandwidth request matrix, according to the fixed bandwidth threshold, the guaranteed bandwidth threshold and the maximum bandwidth threshold, wherein:

the first bandwidth request matrix records the bandwidth requests for bandwidths less than a sum of the fixed bandwidth threshold and the guaranteed bandwidth threshold; in the embodiment, the sum of the fixed bandwidth threshold and the guaranteed bandwidth threshold is 2 OBs, elements in the matrix 1001 are selected as elements at the same positions in the first bandwidth request matrix when the elements in the matrix 1001 are smaller than 2 OBs, and on the contrary, the elements adopt the sum 2 of the fixed bandwidth threshold and the guaranteed bandwidth threshold; the second bandwidth request matrix records the bandwidth requests for bandwidths exceeding the sum of the fixed bandwidth threshold and the guaranteed bandwidth threshold and within the maximum bandwidth threshold; when the elements in the matrix 1001 are smaller than the sum 2 of the fixed bandwidth threshold and the guaranteed bandwidth threshold, the elements at the same positions in the second bandwidth request matrix are recorded as 0; when the elements in the matrix 1001 are more than or equal to the sum 2 of the fixed bandwidth threshold and the guaranteed bandwidth threshold and smaller than the maximum bandwidth threshold 4, the elements at the same positions in the second bandwidth request matrix are recorded as numerical values obtained by subtracting the sum 2 of the fixed bandwidth threshold and the guaranteed bandwidth threshold from the elements in the matrix 1001; when the elements in the matrix 1001 are more than the maximum bandwidth threshold 4, the elements at the same positions in the second bandwidth request matrix are recorded as numerical values, i.e. 2, obtained by subtracting the sum 2 of the fixed bandwidth threshold and the guaranteed bandwidth threshold from the maximum bandwidth threshold 4; the third bandwidth request matrix records the bandwidth requests for bandwidths exceeding the maximum bandwidth threshold; and when the elements in the matrix 1001 are more than the maximum bandwidth threshold 4, the elements at the same positions in the third bandwidth request matrix are recorded as numerical values obtained by subtracting the maximum bandwidth threshold 4 from the elements in the matrix 1001, and on the contrary, are recorded as 0.

The elements at the same positions in the three new bandwidth request matrixes should be summed to obtain the matrix 1001. The master node performs bandwidth assignment on the bandwidth requests for bandwidths within the fixed bandwidth threshold and the guaranteed bandwidth threshold in the first bandwidth request matrix and the additional bandwidth requests in the second bandwidth request matrix, and does not perform bandwidth assignment on the bandwidth requests for bandwidths exceeding the maximum bandwidth threshold in the third bandwidth request matrix.

Furthermore, the master node, after obtaining the three new bandwidth request matrixes, performs first round of bandwidth assignment on OB timeslots one by one to the bandwidth requests with higher priorities in the first bandwidth request matrix according to Step 1120, and then performs second round of bandwidth assignment on OB timeslots one by one to the bandwidth requests with lower priorities in the second bandwidth request matrix according to Step 1130. Each round of bandwidth assignment is performed on OB timeslots one by one from a first OB timeslot to a last timeslot by taking an OB timeslot as a basic unit for bandwidth assignment, that is, destination nodes to which each source node in the first OB timeslot sends one or more OBs are determined at first, and then a second OB timeslot is arranged, till an eighth OB timeslot.

Step 1120: the first round of bandwidth assignment on OB timeslots one by one is performed on the bandwidth requests for bandwidths within the fixed bandwidth threshold and the guaranteed bandwidth threshold.

Specifically, the master node performs granting according to the first bandwidth request matrix, and writes a granting result into the bandwidth request matrix to obtain a first bandwidth grant matrix after first round of bandwidth assignment. During granting, the master node determines the first column of the first bandwidth grant matrix at first, namely determining the destination nodes to which each source node in the first OB timeslot sends the OBs, then determines the second column of the first bandwidth grant matrix, and operates the rest in the same manner. One implementation manner refers to Step 1121-1124.

Step 1130: the second round of bandwidth assignment on OB timeslots one by one is performed on the additional bandwidth requests.

Specifically, after the first round of bandwidth assignment in Step 1120 is implemented, the master node performs granting according to the second bandwidth request matrix, and writes a granting result into the first bandwidth grant matrix to obtain a second bandwidth grant matrix after the second round of bandwidth assignment. The second round of bandwidth granting is performed on the basis of the first round of bandwidth granting, so that bandwidths occupied by the first round of bandwidth granting will not be repeatedly occupied by the second round of bandwidth granting. During granting, the master node looks for available bandwidths in the first column of the first bandwidth grant matrix and performs granting at first, then looks for available bandwidths in the second column and performs granting, and operates the rest in the same manner. Step 1130 may further be split into Step 1131-1134.

Step 1140: after the two rounds of bandwidth assignment are implemented, the master node updates information about the over-the-master-node connections recorded in the matrix 1002.

Specifically, the master node obtains the second bandwidth grant matrix after the two rounds of bandwidth assignment in Step 1120 and Step 1130. The master node outputs bandwidth grants, and updates the matrix 1002 according to the second bandwidth grant matrix. As shown by Step 1140 in FIG. 11, in order to update the matrix 1002, all elements in the matrix 1002 are set into 0. When the master node and a adjacent upstream node D of the master node serve as the destination nodes, connections established with the other nodes are not over the master node A, so that only second and third rows of the matrix 1002 are practically required to be updated to indicate whether over-the-master-node connections are established with node B and node C as the destination nodes or not. Connections between destination node B and source nodes C and D are over-the-master-node connections, and a connection between destination node C and source node D is an over-the-master-node connection. It is discovered by traversing the second bandwidth grant matrix that the destination node B and the source nodes C and D establish over-the-master-node connections in second, third and fifth to eighth timeslots and that the destination node C and the source node D establish over-the-master-node connections in first, fourth and eighth timeslots. On such a basis, the elements in the second row and the second, third and fifth to eighth columns of the matrix 1002 are set into 1, and the elements in the third row and the first, fourth and eighth columns are set into 1.

Figure 12:
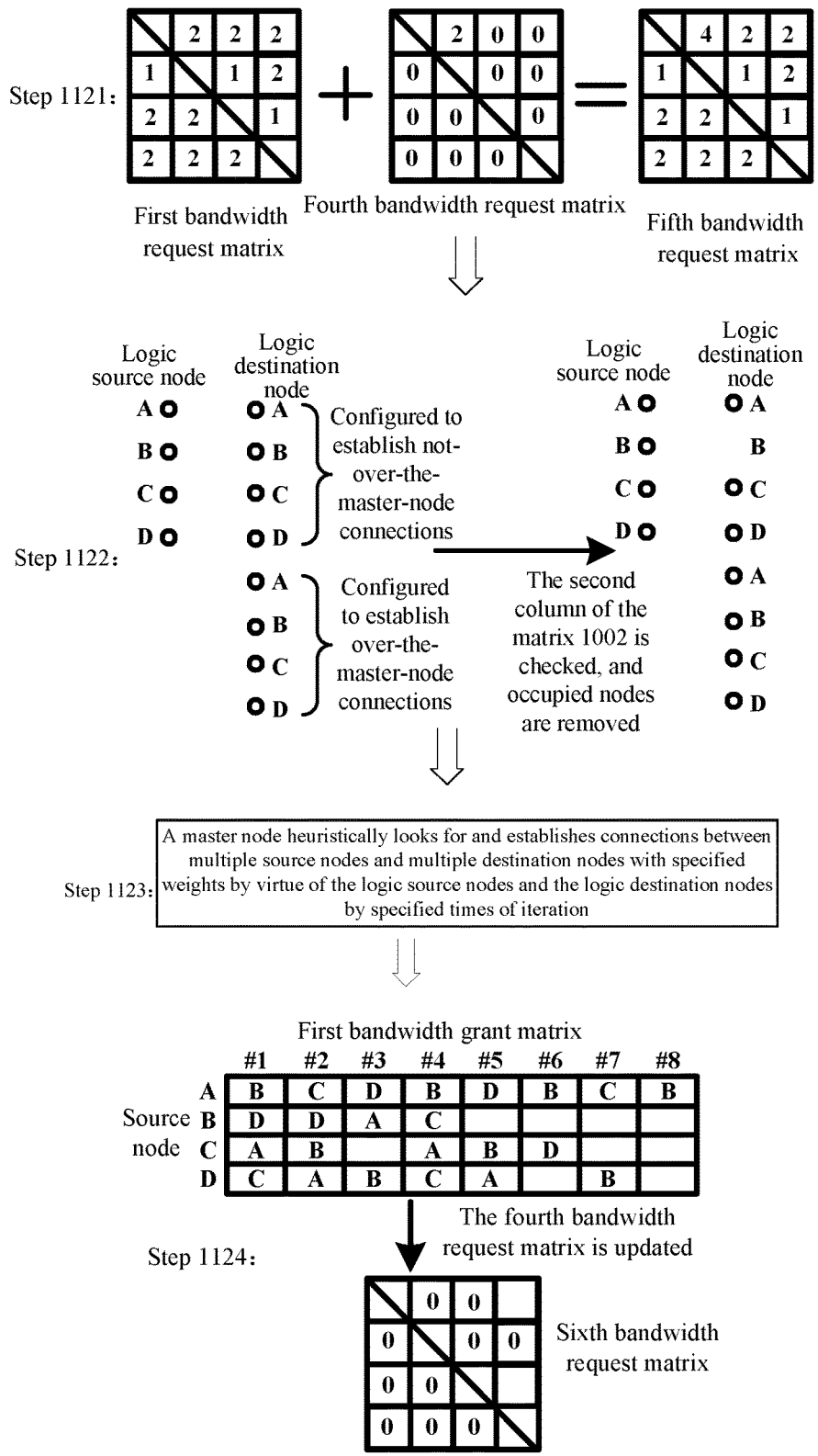
FIG. 12 is a schematic diagram of first round of OB timeslots one by one for bandwidth assignment according to the fourth embodiment of the disclosure.

Wherein, specific implementation of Step 1120, as shown in FIG. 12, includes: Step 1121: the fixed and guaranteed bandwidth requests which are not met before this round of bandwidth assignment are acquired to generate a fourth bandwidth request matrix, and the first bandwidth request matrix and the fourth bandwidth request matrix are summed to obtain a fifth bandwidth request matrix which records temporary bandwidth requests, as shown by Step 1121 in FIG. 12. The master node repeatedly executes Step 1122 and Step 1123 from a first OB timeslot in a current DBA period until bandwidth assignment is performed on all of the 8 OB timeslots.

Values of the fourth bandwidth request matrix in the embodiment are only taken as an example, and all of the values of the fourth bandwidth request matrix may also be 0 during a practical application, and then the first bandwidth request matrix may be directly taken as the fifth bandwidth request matrix.

Step 1122: before bandwidth assignment is performed on a single OB timeslot, the master node establishes a logic source node for each node, and establishes two logic destination nodes, respectively called a first logic destination node and a second logic destination node, for each node, wherein the first logic destination node is configured to establish not-over-the-master-node connections, and the second logic destination node is configured to establish the over-the-master-node connections.

Furthermore, the master node excludes the bandwidth resources occupied by the over-the-master-node connections according to the record in the matrix 1002. For example, as shown by Step 1122 in FIG. 12, before bandwidth granting is performed on the second OB timeslot, the master node establishes the logic source nodes and the logic destination nodes, discovers that destination node B has been occupied by an over-the-master-node connection according to the second column of the matrix 1002, does not establish a not-over-the-master-node connection for the node B in the current OB timeslot to avoid a receiving conflict, and removes the first logic destination node B configured to establish a not-over-the-master-node connection.

Step 1123: the master node heuristically looks for and establishes connections between multiple source nodes and multiple destination nodes with the specified priorities by virtue of the logic source nodes and the logic destination nodes by specified times of iteration. That is, the master node gradually establishes the connections between the multiple source nodes and destination nodes in a single OB timeslot by multiple iterations. Wherein, the priorities of each connection adopt magnitudes of bandwidths of the temporary bandwidth requests in the fifth bandwidth request matrix. In the embodiment, the iteration times is $\log_2^4 2$, and 4 is the number of the nodes. Each detailed iteration process refers to Step 1201-1204.

Step 1124: the master node judges whether bandwidth assignment has been performed on all of the 8 OB timeslots or not. If bandwidth assignment has been performed on all the OB timeslots, the first bandwidth grant matrix after the first round of bandwidth assignment, the bandwidth requests for bandwidths within the fixed bandwidth threshold and the guaranteed bandwidth threshold in the first bandwidth request matrix and the fourth bandwidth request matrix are compared to determine the fixed and guaranteed bandwidth requests which are not met, and the fourth bandwidth request matrix is updated to obtain a sixth bandwidth request matrix. If bandwidth assignment on the 8 OB timeslots has not yet been completely performed, Step 1122 and Step 1123 are repeated. As shown by Step 1123 in FIG. 12, Step 1122 and Step 1123 have been sequentially executed on the 8 OB timeslots to obtain the first bandwidth grant matrix after the first round of bandwidth assignment. In the embodiment, it can be seen from the first bandwidth grant matrix that all of the bandwidth requests in the first bandwidth request matrix and the fourth bandwidth request matrix have been met and all the fixed bandwidth and guaranteed bandwidth requests have been met, so that all elements in the sixth bandwidth request matrix are recorded as 0.

Wherein, Step 1130 is specifically implemented as follows:

Step 1131: the second bandwidth request matrix and the sixth bandwidth request matrix are summed to obtain a seventh bandwidth request matrix which records temporary bandwidth requests, similar to Step 1121. The master node repeatedly executes Step 1132 and Step 1133 from the first OB timeslot in the current DBA period until bandwidth assignment is performed on all of the 8 OB timeslots.

Step 1132: before bandwidth assignment of a single OB timeslot, the master node establishes two logic source nodes and two logic destination nodes for each node. The first logic source node in the two logic source nodes is configured to establish a connection with any destination node in the current DBA period, and the second logic source node is configured to reserve a bandwidth resource for a not-over-the-master-node connection established with a downstream node in a next DBA period. The first logic destination node in the two logic destination nodes is configured to establish a not-over-the-master-node connection, and the second logic destination node is configured to establish an over-the-master-node connection.

Figure 13:
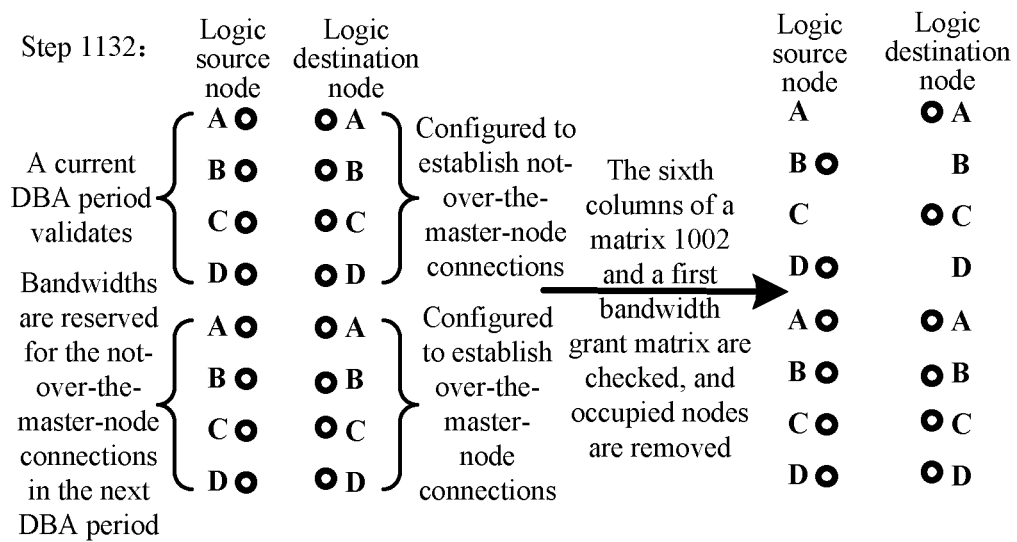
FIG. 13 is a schematic diagram of second round of OB timeslots one by one for bandwidth assignment according to the fourth embodiment of the disclosure.

Furthermore, the master node excludes the bandwidth resources occupied by the over-the-master-node connections according to the record in the matrix 1002. For example, as shown in FIG. 13, before bandwidth granting is performed on the sixth OB timeslot, the master node establishes two logic source nodes and two logic destination nodes, and is not required to remove the first logic destination nodes configured to establish the not-over-the-master-node connections because it is discovered that there are no destination nodes occupied by the over-the-master-node connections in the sixth column of the matrix 1002.

Furthermore, since the first round of bandwidth assignment has been performed, the master node removes nodes for which connections have been arranged according to the first bandwidth grant matrix in Step 1124. For example, the first bandwidth grant matrix in Step 1124 in FIG. 12 shows that the first logic source nodes A and C in the sixth OB timeslot have been occupied and the first logic destination nodes B and D configured to establish the not-over-the-master-node connections have been occupied, so that the first logic source nodes A and C and the first logic destination nodes B and D are further required to be removed.

Step 1133: the master node heuristically looks for and establishes connections between multiple source nodes and multiple destination nodes with the specified priorities by virtue of the logic source nodes and the logic destination nodes by specified times of iteration. That is, the master node gradually establishes the connections between the multiple source nodes and destination nodes in a single OB timeslot by multiple iterations. Wherein, the priorities of each connection adopt magnitudes of bandwidths of the temporary bandwidth requests in the seventh bandwidth request matrix. The iteration times is $\log_2^4 = 2$. Each detailed iteration process refers to Step 1201-1204.

Step 1134: the master node judges whether bandwidth assignment has been performed on all of the 8 OB timeslots or not. If bandwidth assignment has been performed on all the OB timeslots, bandwidth grants added in the second bandwidth grant matrix after the second round of bandwidth assignment compared with the first bandwidth grant matrix are compared with the seventh bandwidth request matrix to determine the fixed and guaranteed bandwidth requests which are still not met after the second round of bandwidth assignment, and the fixed and guaranteed bandwidth request which are not met in the sixth bandwidth request matrix are updated. If bandwidth assignment on the 8 OB timeslots has not yet been completely performed, Step 1132 and Step 1133 are repeated. The second bandwidth grant matrix after the second round of bandwidth assignment is shown in the matrix 1003.

Figure 14A:
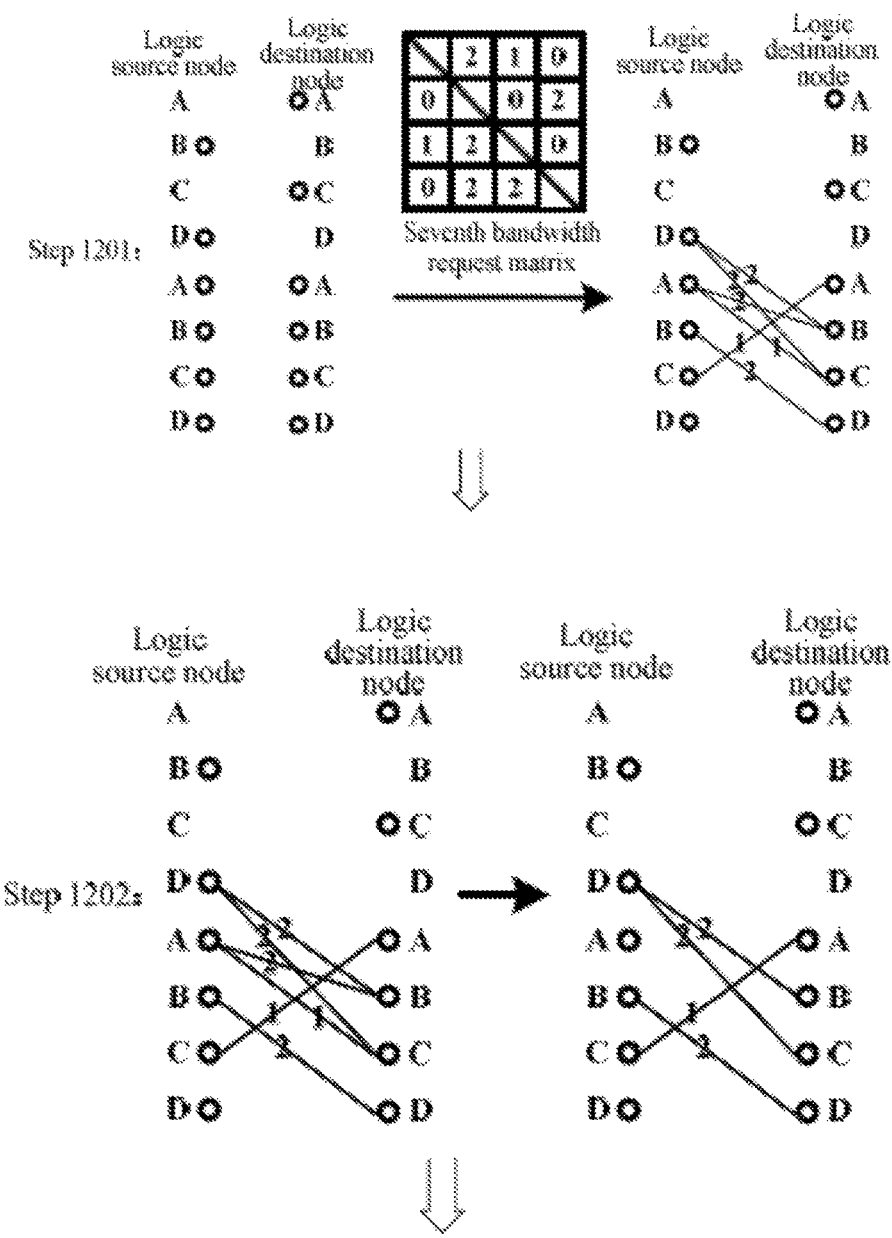
FIG. 14 is a schematic diagram of an iteration process according to embodiment 4 of the disclosure.
Figure 14B:
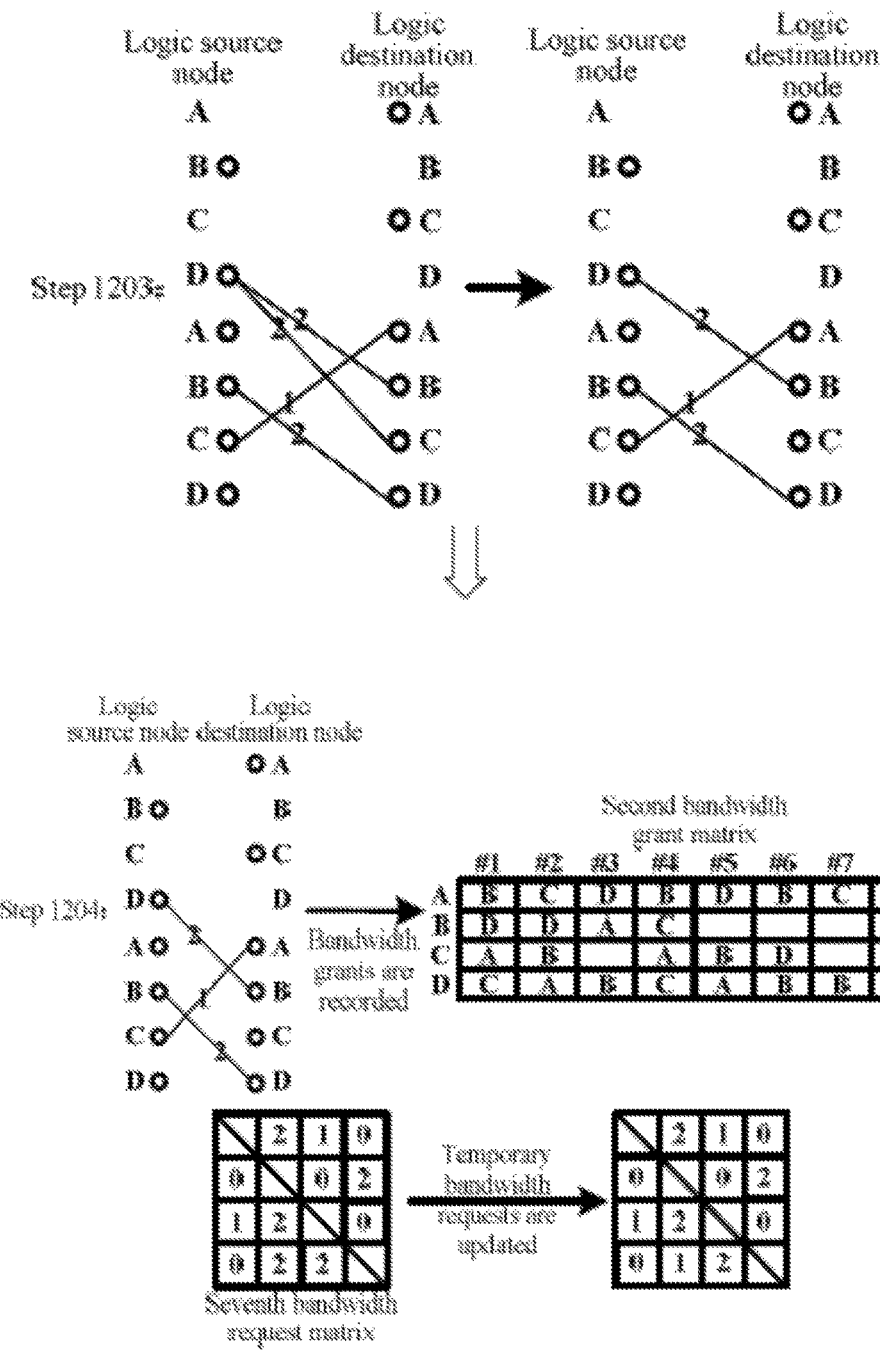

FIG. 14 is another flowchart of a method for bandwidth assignment of an OBRing according to another specific embodiment of the disclosure. Execution steps of an iteration during second round of bandwidth assignment in Step 1133 are described in detail. In addition, the execution steps may be applied to the first round of bandwidth assignment in Step 1123 only by removing the operation related to the second logic source nodes. The embodiment is based on the ring structure shown in FIG. 1, and an executed object of the method is the master node. Referring to FIG. 14, the embodiment includes:

Step 1201: each logic source node in the master node sends virtual requests to the logic destination nodes.

Specifically, before each iteration is started, the master node has prepared for recording the temporary bandwidth requests in the seventh bandwidth request matrix, the logic source nodes and the logic destination nodes. As shown by Step 1201 in FIG. 14, taking the sixth OB timeslot in the second round of bandwidth assignment in FIG. 12 as an example, there are no new bandwidth grants added in the first five OB timeslots, the temporary bandwidth request matrix is still the seventh bandwidth request matrix generated in Step 1131, and the logic source nodes and the logic destination nodes are established by the master node in Step 1132.

Furthermore, during each iteration, each logic source node sends the virtual requests to the logic destination nodes according to the seventh bandwidth request matrix, wherein priorities of the virtual requests are the magnitudes of the elements in the seventh bandwidth request matrix. As shown by Step 1201 in FIG. 14, taking the second row in the seventh bandwidth request matrix as an example, the node B should make a request of establishing a not-over-the-master-node connection with a priority of 2 OBs to the node D, but a first logic destination node of the node D has been removed, so that the node B cannot send a virtual request. Taking the fourth row in the seventh bandwidth request matrix as another example, the node D should respectively make a request of establishing an over-the-master-node connection with a priority of 2 OBs to the nodes B and C according to the second column and the third column in the row, so that the first logic source node D respectively sends a virtual request with a priority 2 to the second logic destination nodes B and C, and as reflected on the drawing, connecting lines are drawn between the logic source node and the logic destination nodes, and the priority 2 is marked on the two connecting lines.

Particularly, the second logic source nodes send the virtual requests to the second logic destination nodes by virtue of the bandwidth requests of the not-over-the-master-node connections in the seventh bandwidth request matrix, wherein the priorities of the requests adopts the magnitudes of the elements in the seventh bandwidth request matrix. As shown by Step 1201 in FIG. 14, the second logic source node C sends a virtual request with a priority 1 to the second logic destination node A because a value of the element in the third row and the first column in the seventh bandwidth request matrix is 1. While the second logic source node C does not send the virtual request by virtue of the over-the-master-node connection requested to the destination node B to be established in the third row and the second column in the seventh bandwidth request matrix.

Step 1202: the logic destination nodes select the virtual requests with the highest priorities, and send virtual grants to the logic source nodes, which send the virtual requests with the highest priorities.

Specifically, the logic destination nodes receive the virtual requests sent by one or more logic source nodes. The logic destination nodes select the virtual requests with the highest priorities, and send the virtual grants to the source nodes sending the virtual requests. For example, as shown by Step 1202 in FIG. 14, the logic destination node B configured to establish an over-the-master-node connection simultaneously receives two virtual requests with a priority 2 from different logic source nodes, the logic destination node B randomly removes one virtual request, and sends a virtual grant to the logic source node of the left virtual request, and as reflected on the drawing, a connecting line between the left source node and the destination node means that the logic destination node has granted the virtual request. For another example, the logic destination node C configured to establish an over-the-master-node connection respectively receives virtual requests with priorities 1 and 2 from different logic destination nodes, and the logic destination node C removes the virtual request with the priority 1, and grants the virtual request with the higher priority 2. Step 1203: the logic source nodes select the virtual grants with the highest priorities for connection establishment.

Specifically, the logic source nodes receive the virtual grants sent by one or more logic destination nodes. The logic source nodes select the virtual grants with the highest priorities, and connections are established between the logic source nodes and the logic destination nodes sending the virtual grants with the highest priorities. For example, as shown by Step 1203 in FIG. 14, the first logic source node D receives two virtual grants with a priority 2 from different logic destination nodes, and the first logic source node D randomly removes one virtual grant, and establishes a connection with the logic destination node B corresponding to the left virtual grant.

Step 1204: after the connections are established, the bandwidth grants are recorded, and the temporary bandwidth requests are updated.

Specifically, as shown by Step 1204 in FIG. 14, a connection is established between the first logic source node D and the second logic destination node B, so that the destination node B is written into a fourth row and a sixth column of the second bandwidth grant matrix, that is, the node D may send an OB of service data to the node B in the sixth OB timeslot. Wherein, the second bandwidth grant matrix is obtained by copying the first bandwidth grant matrix before first iteration is started during the second round of bandwidth assignment.

Particularly, all the connections established by the second logic source nodes are discarded and not written into the second bandwidth grant matrix.

Furthermore, after the connections are established, the temporary bandwidth requests are updated, and the magnitudes of the requests corresponding which the connections has been established are subtracted from the temporary bandwidth requests. As shown by Step 1204 in Step 14, one OB is granted for the connection between the nodes D and B, so that 1 is correspondingly subtracted from the value of the element in the fourth row and the second column in the seventh bandwidth request matrix, which means that a 1-OB bandwidth request of the node D has been met by granting.

Furthermore, after the temporary bandwidth requests are updated, iteration is implemented once, the next iteration is started, and the logic source nodes and logic destination nodes, between which the connections have been established, will not participate in the iteration.

It needs to be noted that each of the abovementioned steps just reflects one iteration process, while one iteration may not establish as many connections as possible between the logic source nodes and the logic destination nodes, and may not make the bandwidth resources completely utilized, so that the iteration process described by Step 1201-1204 is required to be repeated for many times to implement bandwidth granting of one OB timeslot. Sending of the virtual requests and reception of the virtual grants in each of the abovementioned steps are implemented by an internal logic of the master node, and do not involve specific signalling or control frame interaction.

Those of ordinary skill in the art should understand that all or part of steps in the abovementioned methods may be implemented by instructing related hardware through programs, and the programs may be stored in a computer-readable storage medium, such as a read-only memory, a magnetic disk or a compact disk. Optionally, all or part of steps of the abovementioned embodiments may also be implemented by one or more integrated circuits. Correspondingly, each component/element in the abovementioned embodiments may be implemented in form of hardware, and may also be implemented in form of software function component. The disclosure is not limited to any specific form of combination of hardware and software.

The descriptions above are only the example embodiments of the disclosure, which are not used to restrict the disclosure. Any amendments, equivalent substitutions, improvements, etc. within the principle of the disclosure are all included in the scope of the protection of the disclosure.

INDUSTRIAL APPLICABILITY

From the above, a method and device for bandwidth assignment of an OBRing provided by the embodiments of the disclosure have the following beneficial effects: the connections between multiple source nodes and multiple destination nodes are heuristically looked for and established with the specified priorities on OB timeslots one by one by specified times of iteration, thereby fairly and effectively implementing bandwidth assignment in the OBRing. Specifically, adoption of the priorities ensures fairness between different connections. A heuristic iteration algorithm may greatly look for and establish the connections, so that the bandwidth resources may be effectively and completely utilized, and lower algorithm time complexity and easiness in implementation are achieved. An OB timeslot is taken as a basic unit for bandwidth assignment, and bandwidth assignment is performed on one or more OB timeslots one by one without requirements on lengths of optical fibres, so that higher networking flexibility is ensured, and the method for bandwidth assignment is higher in universality; and a method for assigning bandwidths not on OB timeslots one by one may cause limits of the lengths of the optical fibres and inconvenience in networking. According to the embodiments of the disclosure, the bandwidth resources occupied by the over-the-master-node connections are excluded before bandwidth assignment is started, so that the problem of receiving conflict caused by the over-the-master-node service data connection is solved. According to the embodiments of the disclosure, all the second logic destination nodes configured to establish the over-the-master-node connections with the downstream nodes are removed before bandwidth assignment is performed on a single specified OB timeslot, or two logic source nodes are set for each source node to reserve bandwidth resources for the not-over-the-master-node connections before bandwidth assignment is performed on each OB timeslot, so that it may be ensured that the bandwidth resources are fairly utilized between the over-the-master-node connections and the not-over-the-master-node connections. According to the embodiments of the disclosure, the bandwidth requests are classified, and multiple rounds of bandwidth assignment are performed according to the priorities of the bandwidth requests, so that quality of service is distinctively ensured. According to the embodiments of the disclosure, two logic destination nodes are also set for each destination node during iteration, so that the same destination node may simultaneously establish the over-the-master-node connection and the not-over-the-master-node connection in the same OB timeslot, and the bandwidth resources can be effectively and completely utilized.

What is claimed is:

1. A method for bandwidth assignment of an Optical Burst Ring, OBRing, comprising:
   acquiring, by a master node, current bandwidth resources, and excluding bandwidth resources occupied by over-the-master-node connections from the current bandwidth resources to obtain bandwidth resources to be assigned; and
   assigning, by the master node, the bandwidth resources to be assigned to each node according to bandwidth requests of each node in the OBRing;
   wherein the master node takes one Optical Burst, OB, timeslot as a unit and performs the bandwidth assignment on OB timeslots one by one when the bandwidth resources to be assigned are assigned to each node, and executes an operation of excluding the bandwidth resources occupied by the over-the-master-node connections from the current bandwidth resources before the bandwidth assignment is performed on each OB timeslot;
   wherein the method further comprises: before the bandwidth assignment is performed on each OB timeslot, setting, by the master node, a logic destination node, called a first logic destination node, for the master node and an adjacent upstream node of the master node, setting, by the master node, two logic destination nodes, respectively called the first logic destination node and a second logic destination node, for the other nodes except for the master node and the adjacent upstream node of the master node, wherein the first logic destination node is configured to establish a not-over-the-master-node connection with an upstream node of the first logic destination node, and the second logic destination node is configured to establish an over-the-master-node connection with a downstream node of the second logic destination node, and setting, by the master node, one or more logic source nodes for each node;
   acquiring, by the master node, the current bandwidth resources, and excluding the bandwidth resources occupied by the over-the-master-node connections from the current bandwidth resources comprises: before bandwidth assignment is performed on each OB timeslot, acquiring, by the master node, a destination node of an over-the-master-node connection in the current OB timeslot, and excluding the first logic destination node corresponding to the destination node of the over-the-master-node connection; and assigning, by the master node, the bandwidth resources to be assigned to each node according to the bandwidth requests of each node in the OBRing comprises: in each OB timeslot, looking for and establishing, by the master node, connections between the rest of logic source nodes and logic destination nodes according to bandwidth requests existing in the current timeslot, wherein the bandwidth requests existing in the current timeslot are determined based on bandwidth requests according to which this round of bandwidth assignment is performed, bandwidth requests which are not met before this round of bandwidth assignment and bandwidth requests, which have been met in timeslots on which bandwidth assignment has been performed, in this round of bandwidth assignment.

2. The method as claimed in claim 1, wherein the method further comprises:

before the bandwidth assignment is performed, acquiring, by the master node, bandwidth requests in one Dynamic Bandwidth Assignment, DBA, period, classifying, by the master node, each bandwidth request of the bandwidth requests in the DBA period according to service levels to obtain one or more types of bandwidth requests, wherein, each type of bandwidth requests corresponds to one priority, and sequentially performing, by the master node, one or more rounds of bandwidth assignment on each type of bandwidth requests consistent with a preset condition according to priorities of the one or more types of bandwidth requests, wherein each round of bandwidth assignment corresponds to one type of bandwidth requests and bandwidth assignment being performed on OB timeslots one by one by taking one OB timeslot as a unit in each round of bandwidth assignment.

3. The method as claimed in claim 1, wherein in each OB timeslot, looking for and establishing, by the master node, the connections between the rest of logic source nodes and logic destination nodes according to the bandwidth requests existing in the current timeslot comprises:

executing the following iteration process:

sending, by the logic source nodes with bandwidth requests existing in this iteration, virtual requests to logic destination nodes, and specifying, by the logic source nodes with bandwidth requests existing in this iteration, priorities of the virtual requests, wherein the bandwidth requests existing in this iteration are the bandwidth requests existing in the current timeslot during the first iteration;

selecting, by the logic destination nodes, virtual requests with the highest priorities, and sending, by the logic destination nodes, virtual grants to the corresponding logic source nodes, which sends the virtual requests with the highest priorities, wherein priorities of the virtual grants are consistent with the priorities of the virtual requests upon which the virtual grants are responded;

selecting, by the logic source nodes, the virtual grants with the highest priorities, and establishing connections with the corresponding logic destination nodes, which sends the virtual grants with the highest priorities; and judging whether a specified number of iteration times has been reached or not, ending the iteration process if the specified number of iteration times has been reached, otherwise subtracting the bandwidth requests corresponding to which the connections have been established from the bandwidth requests existing in this iteration, excluding the logic source nodes and logic destination nodes between which the connections have been established, and restarting the iteration process.

4. The method as claimed in claim 3, wherein the priorities of the virtual requests are determined according to at least one of the following: magnitudes of the bandwidth requests between the logic source nodes and logic destination nodes corresponding to the virtual requests, caching queue head queuing time of cached data which is sent to the corresponding logic destination nodes by the logic source nodes initiating the virtual requests and a guaranteed bandwidth threshold for the connections between the logic source nodes and logic destination nodes corresponding to the virtual requests.

5. The method as claimed in claim 1, wherein the method further comprises: removing all the second logic destination nodes before bandwidth assignment is performed on a specified OB timeslot.

6. The method as claimed in claim 3, wherein setting the one or more logic source nodes for each node comprises: setting one logic source node for each node.

7. The method as claimed in claim 3, wherein setting the one or more logic source nodes for each node comprises:

setting two logic source nodes for each node, comprising a first logic source node and a second logic source node, wherein the first logic source node is configured to establish connections with the destination nodes in the current DBA period, and the second logic source node is configured to reserve bandwidth resources for not-over-the-master-node connections established with downstream nodes in the next DBA period;

when the iteration process is executed, sending, by the logic source nodes with the bandwidth requests existing in this iteration, the virtual requests to the logic destination nodes comprises: sending, by first logic source nodes with the bandwidth requests existing in this iteration, the virtual requests to the logic destination nodes, and sending, by the second logic source nodes with the bandwidth requests for the not-over-the-master-node connections existing in this iteration, the virtual requests to the second logic destination nodes; and discarding connections established by the second logic source nodes.

8. A device for bandwidth assignment of an Optical Burst Ring, OBRing, comprising: a hardware processor, configured to perform programming components stored in a memory, wherein the programming components comprise:

an input component, configured to acquire current bandwidth resources, and exclude bandwidth resources occupied by over-the-master-node connections from the current bandwidth resources to obtain bandwidth resources to be assigned; and a bandwidth assignment component, configured to assign the bandwidth resources to be assigned to each node according to bandwidth requests of each node in the OBRing;

wherein the bandwidth assignment component is configured to take one Optical Burst, OB, timeslot as a unit and perform the bandwidth assignment on OB timeslots one by one when the bandwidth resources to be assigned are assigned to each node; and the input component is configured to execute an operation of excluding the bandwidth resources occupied by the over-the-master-node connections from the current bandwidth resources before the bandwidth assignment is performed on each OB timeslot;

wherein the bandwidth assignment component comprises a control element and an iteration element, wherein the control element is configured to, before the bandwidth assignment is performed on each OB timeslot, by a master node, set a logic destination node, called a first logic destination node, for the master node and an adjacent upstream node of the master node, set two logic destination nodes, respectively called the first logic destination node and a second logic destination node, for the other nodes except for the master node and the adjacent upstream node of the master node, wherein the first logic destination node is configured to establish a not-over-the-master-node connection with an upstream node of the first logic destination node and the second logic destination node is configured to establish an over-the-master-node connection with a downstream node of the second logic destination node, and set one or more logic source nodes for each node;

the input component is further configured to, before bandwidth assignment is performed on each OB timeslot, acquire a destination node of an over-the-master-node connection in the current OB timeslot, and exclude the first logic destination node corresponding to the destination node of the over-the-master-node connection; and the iteration element is configured to, in each OB timeslot, look for and establish connections between the rest of logic source nodes and logic destination nodes according to bandwidth requests existing in the current timeslot, wherein the bandwidth requests existing in the current timeslot are determined based on the bandwidth requests according to which this round of bandwidth assignment is performed, bandwidth requests which are not met before this round of bandwidth assignment and bandwidth requests which have been met in timeslots on which bandwidth assignment has been performed in this round of bandwidth assignment.

9. The device as claimed in claim 8, wherein the input component is further configured to, before bandwidth assignment is performed, acquire the bandwidth requests in one Dynamic Bandwidth Assignment, DBA, period, and classify each bandwidth request of the bandwidth requests in the DBA period according to service levels to obtain one or more types of bandwidth requests, wherein, each type of bandwidth requests corresponds to one priority; and the bandwidth assignment component is further configured to sequentially perform one or more rounds of bandwidth assignment on each type of bandwidth requests consistent with a preset condition according to their priorities of the one or more types of bandwidth requests, wherein each round of bandwidth assignment corresponds to one type of bandwidth requests and bandwidth assignment being performed on OB timeslots one by one by taking one OB timeslot as a unit in each round of bandwidth assignment.

10. The device as claimed in claim 8, wherein the iteration unit is configured to perform the operation of looking for and establishing the connections between the rest of logic source nodes and logic destination nodes according to the bandwidth requests existing in the current timeslot in each OB timeslot comprises that:

the following iteration process is executed:

the logic source nodes with the bandwidth requests existing in this iteration send virtual requests to logic destination nodes, and specify priorities of the virtual requests, wherein the bandwidth requests existing in this iteration are the bandwidth requests existing in the current timeslot during the first iteration;

the logic destination nodes select virtual requests with the highest priorities, and send virtual grants to the corresponding logic source nodes, which sends the virtual requests with the highest priorities, wherein priorities of the virtual grants are consistent with the priorities of the virtual requests upon which the virtual grants are responded;

the logic source nodes select the virtual grants with the highest priorities, and establish connections with the corresponding logic destination nodes, which sends the virtual grants with the highest priorities; and whether a specified iteration number of times has been reached or not is judged, the iteration process ends if the specified number of iteration times has been reached, otherwise the bandwidth requests corresponding to which the connections have been established are subtracted from the bandwidth requests existing in this iteration, the logic source nodes and logic destination nodes between which the connections have been established are excluded, and the iteration process is restarted.

11. The device as claimed in claim 10, wherein the iteration unit determines the priorities of the virtual requests according to at least one of the following: magnitudes of the bandwidth requests between the logic source nodes and logic destination nodes corresponding to the virtual requests, caching queue head queuing time of cached data which is sent to the corresponding logic destination nodes by the logic source nodes initiating the virtual requests and a guaranteed bandwidth threshold for the connections between the logic source nodes and logic destination nodes corresponding to the virtual requests.

12. The device as claimed in claim 8, wherein the input component is further configured to remove all the second logic destination nodes before bandwidth assignment is performed on a specified OB timeslot.

13. The device as claimed in claim 10, wherein the control element is configured to perform the operation of setting the one or more logic source nodes for each node comprises that:

one logic source node is set for each node;

or, two logic source nodes are set for each node, comprising a first logic source node and a second logic source node, wherein the first logic source node is configured to establish connections with the destination nodes in the current DBA period, and the second logic source node is configured to reserve bandwidth resources for not-over-the-master-node connections established with the downstream nodes in the next DBA period;

when the iteration element executes the iteration process, the operation that the logic source nodes with the bandwidth requests existing in this iteration send the virtual requests to the logic destination nodes comprises that: the first logic source nodes with the bandwidth requests existing in this iteration send the virtual requests to the logic destination nodes, and the second logic source nodes with the bandwidth requests for the not-over-the-master-node connections existing in this iteration send the virtual requests to the second logic destination nodes; and connections established by the second logic source nodes are discarded.

* * * * *